US012731877B2

(12) United States Patent
Liu et al.

(10) Patent No.: US 12,731,877 B2
(45) Date of Patent: Sep. 8, 2026

(54) PHASE SHIFTER COMPRISING FIRST AND SECOND BASE PLATES WITH ELECTRODE LAYERS AND AN ADJUSTABLE DIELECTRIC LAYER DISPOSED THEREBETWEEN

(71) Applicants: BOE Technology Group Co., Ltd., Beijing (CN); BEIJING BOE SENSOR TECHNOLOGY CO., LTD., Beijing (CN)

(72) Inventors: Yong Liu, Beijing (CN); Xiaobo Wang, Beijing (CN); Lei Wang, Beijing (CN); Zhifeng Zhang, Beijing (CN); Xiaoqiang Yang, Beijing (CN); Yan Lu, Beijing (CN); Zhao Cui, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 18/686,628

(22) PCT Filed: Feb. 28, 2023

(86) PCT No.: PCT/CN2023/078794
§ 371 (c)(1),
(2) Date: Feb. 26, 2024

(87) PCT Pub. No.: WO2024/178622
PCT Pub. Date: Sep. 6, 2024

(65) Prior Publication Data
US 2025/0141075 A1 May 1, 2025

(51) Int. Cl.
*H01P 1/18* (2006.01)
*H01P 11/00* (2006.01)
*H01Q 3/36* (2006.01)

(52) U.S. Cl.
CPC .............. *H01P 1/181* (2013.01); *H01P 1/184* (2013.01); *H01P 11/001* (2013.01); *H01Q 3/36* (2013.01)

(58) Field of Classification Search
CPC ............ H01P 1/181; H01P 1/184; H01Q 3/36
(Continued)

(56) References Cited

U.S. PATENT DOCUMENTS 11,843,151 B2 * 12/2023 Kong et al. ............. H01P 1/184
2020/0099115 A1 * 3/2020 Sun ......................... H01P 1/184
(Continued)

FOREIGN PATENT DOCUMENTS

CN 103295959 A 9/2013
CN 113725597 A 11/2021
(Continued)

*Primary Examiner* — Benny T Lee
(74) *Attorney, Agent, or Firm* — WHDA, LLP

(57) ABSTRACT

A phase shifter and a preparation method thereof, and an electronic device. The phase shifter includes: an adjustable dielectric layer, arranged between a first electrode layer and a second electrode layer, and including a first support structure, wherein the first support structure is arranged on at least one side of a first region, and an orthographic projection of the first support structure on a first base plate is at least non-overlapping with an orthographic projection of the first region on the first base plate. The phase shifter provided in the present application is arranged in the non-capacitive overlap region between the first base plate and the second base plate through the first support structure, which can not only provide good support, but also reduce or even eliminate the impact on phase shifting, achieving large phase
(Continued)

shift amount, high uniformity of phase shift degrees, and low loss.

20 Claims, 10 Drawing Sheets

(58) Field of Classification Search
USPC .......................................................... 333/161
See application file for complete search history.

(56) References Cited

U.S. PATENT DOCUMENTS

| | | | | |
|---|---|---|---|---|
| 2020/0381822 | A1 | 12/2020 | Orui et al. | |
| 2021/0408680 | A1 | 12/2021 | Xi et al. | |
| 2022/0140457 | A1 * | 5/2022 | Wang et al. | H01P 9/006 333/161 |

FOREIGN PATENT DOCUMENTS

| | | | |
|---|---|---|---|
| CN | 113871818 | A | 12/2021 |
| CN | 113871819 | A | 12/2021 |
| CN | 113889750 | A | 1/2022 |
| CN | 113937439 | A | 1/2022 |
| CN | 114256571 | A | 3/2022 |
| JP | H08-277487 | A | 10/1996 |
| WO | 2022/242188 | A1 | 11/2022 |

* cited by examiner

PHASE SHIFTER COMPRISING FIRST AND SECOND BASE PLATES WITH ELECTRODE LAYERS AND AN ADJUSTABLE DIELECTRIC LAYER DISPOSED THEREBETWEEN

TECHNICAL FIELD

The present application relates to the technical field of mobile communication and more particularly, to a phase shifter and a preparation method thereof, and an electronic device.

BACKGROUND

With the continuous development of mobile communication technology, now in 5G new infrastructure, as an indispensable component in mobile communication devices, antennas are widely used. An important component in the antennas is the phase shifter, which mainly changes the phase of microwave signals. This requires the phase shifter to have characteristics such as large phase shift amount, small loss, and miniaturization.

However, current phase shifter often suffer from problems such as low phase shift amount, poor uniformity of phase shift degrees, large loss, and the user experience is poor.

SUMMARY OF THE INVENTION

Embodiments of the present application employ the following technical solutions:

in an aspect, the embodiments of the present application provide a phase shifter and a preparation method thereof, and an electronic device, and the phase shifter includes:

a first base plate and a second base plate, wherein the first base plate and the second base plate are arranged opposite to each other;

a first electrode layer, arranged at a side of the first base plate close to the second base plate, and including a first electrode, a first control line and a first insulation part, wherein the first electrode and the first control line are electrically connected, and the first insulation part covers the first electrode and the first control line;

a second electrode layer, arranged at a side of the second base plate close to the first electrode layer, and including a second electrode, a second control line and a second insulation part, wherein the second electrode and the second control line are electrically connected, and the second insulation part covers the second electrode and the second control line; along a direction perpendicular to the first base plate, the first electrode and the second electrode at least partially overlap to form a first region; and an adjustable dielectric layer, arranged between the first electrode layer and the second electrode layer, and including a first support structure, wherein the first support structure is arranged on at least one side of the first region, and an orthographic projection of the first support structure on the first base plate is at least non-overlapping with an orthographic projection of the first region on the first base plate.

Optionally, along the direction perpendicular to the first base plate, the first electrode and the second electrode partially overlap to form the first region, and a non-overlapping part between the first electrode and the second electrode forms a second region;

the orthographic projection of the first support structure on the first base plate and an orthographic projection of the second region on the first base plate are non-overlapping.

Optionally, along the direction perpendicular to the first base plate, the first electrode and the second electrode completely overlap to form the first region.

Optionally, in a first direction and a second direction, spacings between the orthographic projection of the first support structure on the first base plate and the orthographic projection of the first region on the first base plate are greater than or equal to 400 μm; wherein the first direction is perpendicular to the second direction.

Optionally, the adjustable dielectric layer further includes a first orientation part and a second orientation part, the first orientation part is located at a side of the first insulation part away from the first electrode, and the second orientation part is located at a side of the second insulation part away from the second electrode; and a height g1 of the first support structure along the direction perpendicular to the first base plate satisfies $g1=h1+h2+h3-h4-h5$; wherein h1 is a height g1 of the first electrode along the direction perpendicular to the first base plate, h2 is a height g1 of the second electrode along the direction perpendicular to the first base plate, h3 is a spacing between the first base plate and the second base plate along the direction perpendicular to the first base plate, h4 is a height g1 of the first orientation part along the direction perpendicular to the first base plate, and h5 is a height g1 of the second orientation part along the direction perpendicular to the first base plate.

Optionally, the first support structure includes a plurality of support columns, adjacent support columns are arranged at an interval; all of the support columns are divided into a plurality of support groups, each support group includes the plurality of support columns; and at least one side of the first region is provided with the plurality of support groups, the plurality of support groups located at a same side of the first region are sorted in the first direction, the support group located in a first sequence is a first support group, the support group located in a last sequence is a second support group; an area of orthographic projections of the support columns in the first support group on the first base plate is greater than an area of orthographic projections of the support columns in the second support group on the first base plate; within a unit area, a distribution density of the support columns in the first support group is less than a distribution density of the support columns in the second support group.

Optionally, the support group located in a middle sequence is a third support group; and along a direction from the first support group to the second support group, an area of orthographic projections of the support columns in each support group on the first base plate decreases sequentially; within a unit area, a distribution density of the support columns in each support group increases sequentially.

Optionally, along the first direction, the first support structures are arranged at two sides of the first region, and are mirror symmetrical about the first region;

a side of the first region is provided with one first support group, one second support group and one third support group, the support columns in each support group are arranged along the second direction, and the area of the orthographic projections of the support columns in each support group on the first base plate is the same; spacings between geometric centers of adjacent support columns in each support group are the same, and are the same as spacings between geometric centers of adjacent support columns in the other support groups;

a shape of the orthographic projections of the support columns in each support group on the first base plate is a circle, and a radius range of the circle includes 20-200 μm; and a height range of the support columns in each support group along the direction perpendicular to the first base plate includes 5-50 μm.

Optionally, in the second direction, connecting lines of the geometric centers of the plurality of support columns in the first support group are in a straight line, connecting lines of the geometric centers of the plurality of support columns in the second support group are in a straight line, and connecting lines of the geometric centers of the plurality of support columns in the third support group are in a straight line; the connecting lines of the geometric centers of the plurality of support columns in the first support group, the connecting lines of the geometric centers of the plurality of support columns in the second support group and the connecting lines of the geometric centers of the plurality of support columns in the third support group are all parallel; and in the first direction and the second direction, the spacings between the orthographic projection of the first support group on the first base plate and the orthographic projection of the first region on the first base plate are greater than 400 μm, spacings between an orthographic projection of the third support group on the first base plate and the orthographic projection of the first support group on the first base plate are greater than 500 μm, and spacings between an orthographic projection of the second support group on the first base plate and the orthographic projection of the third support group on the first base plate are greater than 600 μm.

Optionally, the first support structure at least includes a support part, and the support part is patterned and arranged surrounding the first region; and the support part includes a plurality of first patterns, adjacent first patterns are arranged at an interval, and orthographic projections of the plurality of first patterns on the first base plate are at least partially the same.

Optionally, the support part is arranged completely surrounding the first region; in the first direction and the second direction, spacings between an orthographic projection of the support part on the first base plate and the orthographic projection of the first region on the first base plate are equal to 400 μm; and the first region and the support part are both symmetrical about the first axis.

Optionally, shapes of the orthographic projections of the plurality of first patterns on the first base plate includes rectangles and irregular polygons, and areas of the rectangles are at least partially different from areas of the irregular polygons; or the shapes of the orthographic projections of the plurality of first patterns on the first base plate includes circles, areas of the circles are the same.

Optionally, the first support structure further includes a plurality of support columns, adjacent support columns are arranged at an interval; all of the support columns are divided into a plurality of support groups, and each support group includes the plurality of support columns; and at least one side of the support part is provided with the plurality of support groups, the plurality of support groups located at a same side of the support part are sorted in the first direction, the support group located in a first sequence is a fourth support group, the support group located in a last sequence is a fifth support group, and the support group located in a middle sequence is a sixth support group; areas and shapes of the orthographic projections of the support columns in each support group on the first base plate are both the same.

Optionally, the first support structure further includes a plurality of support columns, adjacent support columns are arranged at an interval; all of the support columns are divided into a plurality of support groups, and each support group includes the plurality of support columns; and at least one side of the support part is provided with the plurality of support groups, the plurality of support groups located at a same side of the support part are sorted in the first direction, the support group located in a first sequence is a fourth support group, the support group located in a last sequence is a fifth support group, and the support group located in a middle sequence is a sixth support group; along a direction from the fourth support group to the fifth support group, an area of orthographic projections of the support columns in each support group on the first base plate decreases sequentially.

Optionally, a material of the first electrode includes copper, and a thickness range of the first electrode along the direction perpendicular to the first base plate includes 0.5-10 μm; and a material of the second electrode includes copper, and a thickness range of the second electrode along a direction perpendicular to the second base plate includes 0.5-10 μm.

Optionally, along the direction perpendicular to the first base plate, a thickness of an overlapping part between the first insulation part and the first electrode is less than a thickness of an overlapping part between the first insulation part and the first control line, and a thickness of an overlapping part between the second insulation part and the second electrode is less than a thickness of an overlapping part between the second insulation part and the second control line.

Optionally, along the direction perpendicular to the first base plate, the thickness of the overlapping part between the first insulation part and the first electrode is equal to the thickness of the overlapping part between the second insulation part and the second electrode, and the thickness of the overlapping part between the first insulation part and the first control line is equal to the thickness of the overlapping part between the second insulation part and the second control line;

a range of the thickness of the overlapping part between the first insulation part and the first electrode includes 300-500 Å; and a range of the thickness of the overlapping part between the first insulation part and the first control line includes 850-2000 Å.

Optionally, the phase shifter further includes a first alignment layer and a second alignment layer, the first alignment layer is located between the first base plate and the first electrode layer, and the second alignment layer is located between the second base plate and the second electrode layer; and the first alignment layer includes a third insulation part, the second alignment layer includes a fourth insulation part; along the direction perpendicular to the first base plate, a thickness of an overlapping part between the third insulation part and the first electrode is less than a thickness of an overlapping part between the third insulation part and the first control line, and a thickness of an overlapping part between the fourth insulation part and the second electrode is less than a thickness of an overlapping part between the fourth insulation part and the second control line.

Optionally, the first electrode layer further includes a plurality of first auxiliary electrodes, the first auxiliary electrodes are spaced apart from the first electrode, an activity of the first auxiliary electrodes is greater than an activity of the first electrode, and the first auxiliary electrodes are at least located at one side of the first electrode; and the second electrode layer further includes a plurality of second auxiliary electrodes, the second auxiliary electrodes are spaced apart from the second electrode, an activity of the second auxiliary electrodes is greater than an activity of the second electrode, and the second auxiliary electrodes are at least located at one side of the second electrode.

Optionally, each of the plurality of first auxiliary electrodes includes a plurality of first sub-electrodes that are discrete, or, each of the plurality of first auxiliary electrodes is an integrated structure; and each of the plurality of second auxiliary electrodes includes a plurality of second sub-electrodes that are discrete, or, each of the plurality of second auxiliary electrode is the integrated structure.

Optionally, the plurality of first auxiliary electrodes are arranged completely surrounding the first electrode; and the plurality of second auxiliary electrode are arranged completely surrounding the second electrode.

Optionally, the first control line includes a first subpart and a second subpart, the first subpart includes a plurality of first sub control lines, the second subpart is an integrated structure, one end of the plurality of first sub control lines is connected to the second subpart, and the other end of the plurality of first sub control lines is connected to the first electrode; and the second control line includes a third subpart and a fourth subpart, the third subpart includes a plurality of second sub control lines, the fourth subpart is the integrated structure, one end of the plurality of second sub control lines is connected to the fourth subpart, and the other end of the plurality of second sub control lines is connected to the second electrode.

Optionally, the phase shifter further includes a first flat layer and a second flat layer, the first flat layer covers the first electrode layer, and the second flat layer covers the second electrode layer.

Optionally, in the direction perpendicular to the first base plate, along a direction from close to the first base plate to away from the first base plate, a density of the first electrode decreases; and in a direction perpendicular to the second base plate, along a direction from close to the second base plate to away from the second base plate, a density of the second electrode decreases.

Optionally, the adjustable dielectric layer further includes dielectrics, the dielectrics are located between the first orientation part and the second orientation part; and a dielectric constant of the dielectrics is greater than or equal to 1.

In another aspect, the embodiment of the present application provides an electronic device, including the above phase shifter.

In yet another aspect, the embodiment of the present application provides a preparation method of the above phase shifter, and the preparation method includes:

providing the first base plate;

forming the first electrode layer on the first base plate;

forming a first flat layer on the first electrode layer;

forming the first support structure on the first flat layer, to form a first cell base plate;

providing the second base plate;

forming the second electrode layer on the second base plate;

forming a second flat layer on the second electrode layer, to form a second cell base plate;

arranging the first cell base plate and the second cell base plate opposite to each other, forming a first orientation part on the first flat layer, forming a second orientation part on the second flat layer, and injecting dielectrics.

Optionally, forming the first electrode layer on the first base plate includes:

forming the first electrode and the first control line on the first base plate; and forming an insulation part on the first electrode and the first control line, and performing thinning treatment on an overlapping part between the insulation part and the first electrode along the direction perpendicular to the first base plate, to form the first electrode layer;

wherein forming the second electrode layer on the second base plate includes:

forming the second electrode and the second control line on the second base plate; and forming another insulation part on the second electrode and the second control line, and performing the thinning treatment on an overlapping part between the another insulation part and the second electrode along a direction perpendicular to the second base plate, to form the second electrode layer.

Optionally, before forming the first electrode layer on the first base plate, the preparation method further includes:

forming a plurality of first alignment marks on the first base plate; and forming a third insulation part on the plurality of first alignment marks, and performing the thinning treatment on an overlapping part between the third insulation part and the first electrode along the direction perpendicular to the first base plate, to form a first alignment layer;

wherein before forming the second electrode layer on the second base plate, the preparation method further includes:

forming a plurality of second alignment marks on the second base plate; and forming a fourth insulation part on the plurality of second alignment marks, and performing the thinning treatment on an overlapping part between the fourth insulation part and the second electrode along the direction perpendicular to the second base plate, to form a second alignment layer.

The above description is only an overview of the technical solution of the present application. In order to have a clearer understanding of the technical means of the present application, it can be implemented according to the content of the specification. In order to make the above and other purposes, features, and advantages of the present application more obvious and easier to understand, the specific implementation methods of the present application are listed below.

BRIEF DESCRIPTION OF THE DRAWINGS

In order to provide a clearer explanation of the technical solution in the embodiments of the present application or related art, a brief introduction will be given below to the accompanying drawings required in the description of the embodiments or prior art. It is evident that the accompanying drawings in the following description are only some embodiments of the present application.

DETAILED DESCRIPTION OF THE INVENTION

Figure 1:
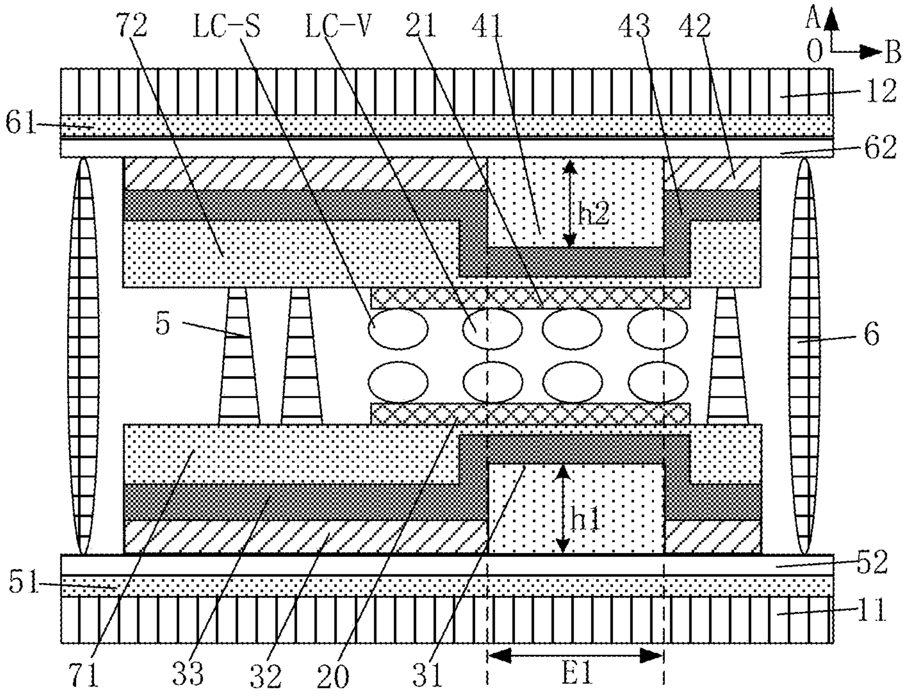
FIG. 1 is a schematic structural diagram of a phase shifter according to an embodiment of the present application.

In order to make the purpose, technical solution, and advantages of the present application clearer, further detailed descriptions of the present application will be provided below in conjunction with the accompanying drawings. Obviously, the embodiments of the present application are only a part of the embodiments of the present application, not all of the embodiments.

In all of the drawings, for clarity, the thicknesses of the regions and the layers may have been exaggerated. The same accompanying symbols in all of the drawings represent the same or similar structures, therefore their detailed descriptions will be omitted. In addition, the accompanying drawings are only illustrative illustrations of the present application and are not necessarily drawn to scale.

In the embodiment of the present application, unless otherwise specified, "plurality of" means two or more. The orientation or positional relationship indicated by terms such as "up" is based on the orientation or positional relationship shown in the drawings, and is only for the convenience of describing and simplifying the present application, rather than indicating or implying that the structure or element referred to must have a specific orientation, or be constructed and operated in a specific orientation, and therefore cannot be understood as a restriction on the present application.

Unless the context otherwise requires, in the entire specification and claims, the term "including" is interpreted as open and inclusive, meaning "including, but not limited to". In the description of the specification, the terms "one embodiment," "some embodiments," "exemplary embodiments," "examples," "specific examples," or "some examples," etc. are intended to indicate that specific features, structures, materials, or features related to the embodiment or example are included in at least one embodiment or example of the present application. The schematic representation of the above terms may not necessarily refer to the same embodiment or example. Furthermore, the specific features, structures, materials, or features described may be included in any one or more embodiments or examples in any appropriate manner.

In the embodiments of the present application, using words such as "first", "second", "third", "fourth", etc. to distinguish similar or identical items with basically identical functions and effects is only for the purpose of clearly describing the technical solution of the embodiments of the present application, and cannot be understood as indicating or implying relative importance or implying the number of indicated technical features.

The rapid development of society has brought about the rapid growth of information flow, and the communication in the modern society cannot do without antennas. A phased array antenna is one of them, and the phase shifter is an important component of the phased array antennas. The main function of the phase shifter is to change the phase of microwave signals, which requires it to have characteristics such as large phase shift amount, small loss, and small volume.

The commonly used phase shifter currently includes a mechanical phase shifter and an electronic phase shifter. The mechanical phase shifter mainly achieves phase change by changing the position of the medium and/or changing the physical length of the transmission line. However, the mechanical phase shifter has a large volume, is constrained by inertia, and cannot quickly change the phase in a short period of time. Although the electronic phase shifter can quickly change the phase, they are expensive, complex in design, poor in intermodulation, and unable to adjust the phase.

In order to solve the above problems, a liquid crystal phase shifter has emerged, which have attracted widespread attention due to their ultra-thin structure, low cost, small size, light weight, low power consumption, and fast response. The key indicators that affect the performance of the liquid crystal phase shifter include the phase shift amount and the loss. However, the currently common liquid crystal phase shifter often has drawbacks such as low phase shift amount, poor uniformity of the phase shift degrees, and large loss, which in turn affect the performance of the antennas based on the liquid crystal phase shifter.

Figure 2:
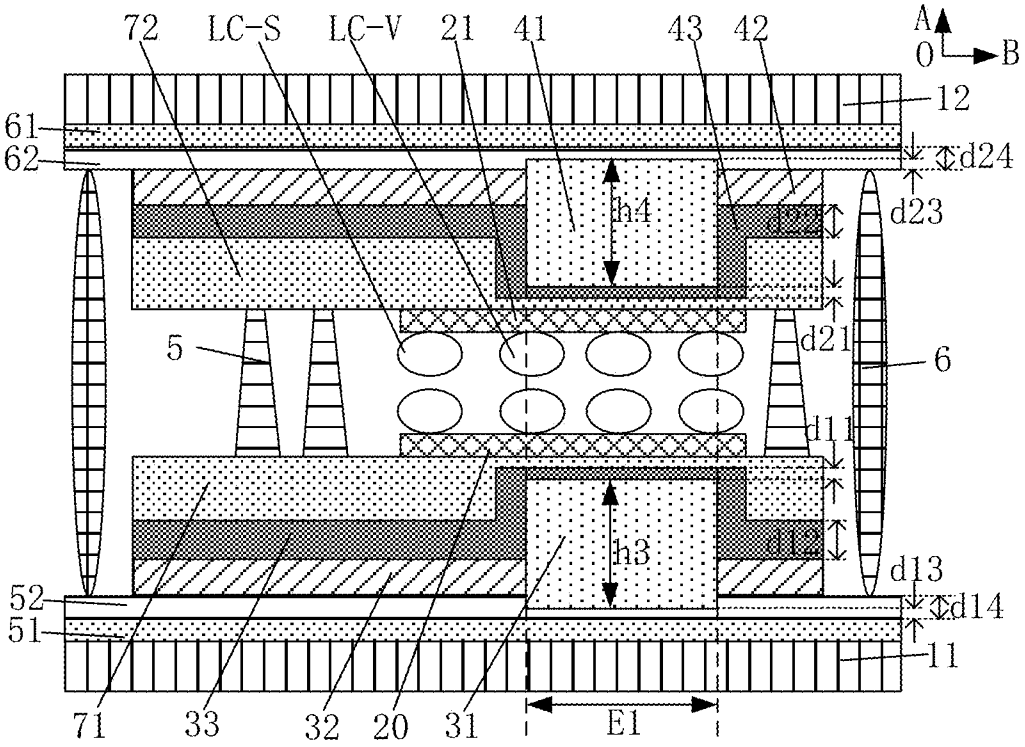
FIG. 2 is a schematic structural diagram of another phase shifter according to an embodiment of the present application.

Based on the above, an embodiment of the present application provides a phase shifter, as shown in FIG. 1 and FIG. 2, the phase shifter includes:

- a first base plate 11 and a second base plate 12, wherein the first base plate 11 and the second base plate 12 are arranged opposite to each other;
- a first electrode layer, arranged at a side of the first base plate 11 close to the second base plate 12, and including a first electrode 31, a first control line 32 and a first insulation part 33, wherein the first electrode 31 and the first control line 32 are electrically connected, and the first insulation part 33 covers the first electrode 31 and the first control line 32;
- a second electrode layer, arranged at a side of the second base plate 12 close to the first electrode layer, and including a second electrode 41, a second control line 42 and a second insulation part 43, wherein the second electrode 41 and the second control line 42 are electrically connected, and the second insulation part 43 covers the second electrode 41 and the second control line 42; along a direction perpendicular to the first base plate 11, the first electrode 31 and the second electrode 41 at least partially overlap to form a first region E1; and
- an adjustable dielectric layer, arranged between the first electrode layer and the second electrode layer, and including a first support structure 5, wherein the first support structure 5 is arranged on at least one side of the first region E1, and an orthographic projection of the first support structure 5 on the first base plate 11 is at least non-overlapping with an orthographic projection of the first region E1 on the first base plate 11.

There is no specific restriction on the structure of the first base plate mentioned above. For example, the first electrode layer is directly arranged on the first base plate. Alternatively, the first base plate can include a first substrate and the first electrode layer arranged on a side of the first substrate close to the adjustable dielectric layer. Certainly, the first base plate can also include other film layers besides the first substrate and first electrode layer, which is determined specifically depending on the actual application scenario, function, and the like of the phase shifter.

There is no specific restriction on the structure of the second base plate mentioned above. For example, the second electrode layer is directly arranged on the second base plate. Alternatively, the second base plate may include a second substrate and the second electrode layer arranged on a side of the second substrate close to the adjustable dielectric layer. Certainly, the second substrate can also include other film layers besides the second substrate and second electrode layer, which is determined specifically depending on the actual application scenario, function, and the like of the phase shifter.

There are no specific restrictions on the materials, the thicknesses, etc. of the first base plate and the second base plate mentioned above. The materials, the thicknesses, etc. of the first base plate and the second base plate can be the same, certainly, these materials can also be different, which shall be subject to the actual application. For example, the materials and the thicknesses of the first base plate and the second base plate are the same. Alternatively, the materials and the thicknesses of the first base plate and the second base plate are different. Alternatively, the materials of the first base plate and the second base plate are the same, but the thicknesses are different. Alternatively, the materials of the first base plate and the second base plate are different, but the thicknesses are the same. When the materials of the first base plate and the second base plate are the same, the materials of both can be, for example, glass, printed circuit boards (PCB), ceramics, and so on. When the materials of the first base plate and the second base plate are both glass, the glass may include transparent glass; or, the glass may include opaque glass. In order to better match the phase shifter with circuits based on the glass substrates, preferably, the materials of the first base plate and the second base plate are both transparent glass.

There are no specific restrictions on the shape, material, thickness, etc. of the first electrode mentioned above. For example, the first electrode may be an integrated structure; or, the first electrode may include a plurality of first electrode parts that are discrete, spaced, and insulated. For example, the material of the first electrode may include conductive metals such as copper, silver, aluminum, and the like. For example, a height range of the first electrode along the direction perpendicular to the first base plate may include 0.5-10 μm.

There are no specific restrictions on the materials, thickness, etc. of the first control line mentioned above. For example, the material of the first control line may include conductive materials, such as ITO (Indium Tin Oxides), etc. For example, a height range of the first control line along the direction perpendicular to the first base plate may include 490-510 Å. Specifically, the height range of the first control line along the direction perpendicular to the first base plate can be 490 Å, 500 Å, 510 Å, and so on.

There are no specific restrictions on the electrical connection method between the first electrode and the first control line mentioned above. For example, as shown in FIG. 1 and FIG. 2, the first electrode 31 and the first control line 32 can be directly electrically connected; or, the first electrode and the first control line can be electrically connected through other structures.

There are no specific restrictions on the shape, material, thickness, etc. of the second electrode mentioned above. For example, the second electrode may be an integrated structure; or, the second electrode may include a plurality of second electrode parts that are discrete, spaced, and insulated. For example, the material of the second electrode may include conductive metals such as copper, silver, aluminum, and the like. For example, a height range of the second electrode along the direction perpendicular to the second base plate may include 0.5-10 μm.

There are no specific restrictions on the materials, thickness, etc. of the second control line mentioned above. For example, the material of the second control line may include conductive materials, such as ITO (Indium Tin Oxides), etc. For example, a height range of the second control line along the direction perpendicular to the second base plate may include 490-510 Å. Specifically, the height range of the second control line along the direction perpendicular to the second base plate can be 490 Å, 500 Å, 510 Å, and so on.

There are no specific restrictions on the electrical connection method between the second electrode and the second control line mentioned above. For example, as shown in FIG. 1, the second electrode 41 and the second control line 42 can be directly electrically connected; or, the second electrode and the second control line can be electrically connected through other structures.

The first insulation part covers the first electrode and the first control line, which means that: as shown in FIG. 1, the first insulation part 33 covers a surface of a side of the first electrode 31 away from the first base plate 11, and a surface of a side of the first control line 32 away from the first base plate 11. Certainly, the first insulation part can cover not only the surface of the side of the first electrode away from the first base plate and the surface of the side of the first control line away from the first base plate, but also other surfaces such as the side of the first control line, which shall be subject to the actual application.

There are no specific restrictions on the material of the first insulation part mentioned above. For example, the material of the first insulation part may include insulation materials, such as silicon nitride, etc.

The second insulation part covers the second electrode and the second control line, which means that: as shown in FIG. 1, the second insulation part 43 covers a surface of a side of the second electrode 41 away from the second base plate 12, and a surface of a side of the second control line 42 away from the second base plate 12. Certainly, the second insulation part can cover not only the surface of the side of the second electrode away from the second base plate and the surface of the side of the second control line away from the second base plate, but also other surfaces such as the side of the second control line, which shall be subject to the actual application.

There are no specific restrictions on the material of the second insulation part mentioned above. For example, the material of the second insulation part may include insulation materials, such as silicon nitride, etc.

Along a direction perpendicular to the first base plate, the first electrode and the second electrode at least partially overlap to form a first region, which means that: along the direction perpendicular to the first base plate, the first electrode and the second electrode partially overlap to form the first region; or, referring to FIG. 1 and FIG. 2, along the direction perpendicular to the first base plate 11, the first electrode 31 and the second electrode 41 completely overlap to form the first region E1, there are no specific restrictions here. Among them, the first region mentioned above refers to the region where the overlapping capacitance is formed between the first electrode and the second electrode.

The above adjustable dielectric layer may include dielectrics, whose dielectric constant can be changed under different electric fields, thereby enabling the phase shifter to perform phase shifting. There is no specific restriction on the range of the dielectric constant of the dielectrics here. For example, the range of the dielectric constant of the dielectrics can be greater than or equal to 1. There is no specific restriction on the above-mentioned dielectrics here. For example, the dielectrics may be the liquid crystal. When the dielectrics are the liquid crystal, the relative dielectric constant of the liquid crystal is greater than 1. The specific relative dielectric constant of the liquid crystal can be determined in the actual process based on the material of the liquid crystal, the working wavelength of the phase shifter, etc. FIG. 1 and FIG. 2 are illustrated using the dielectrics as an example for the liquid crystal. At this time, the liquid crystal located between the first electrode 31 and the second electrode 41 is marked as LC-V, which can change the relative dielectric constant under the electric field of the first electrode 31 and the second electrode 41. And the liquid crystals between the first base plate 11 and the second base plate 12 are marked as LC-S, except for the liquid crystals between the first electrode 31 and the second electrode 41.

The above first support structure can support the first base plate and the second base plate. The first support structure is arranged on at least one side of the first region, which means that: the first support structure is arranged on one side of the first region; or, the first support structure is arranged on multiple sides of the first region, there is no specific restriction here.

An orthographic projection of the first support structure on the first base plate is at least non-overlapping with an orthographic projection of the first region on the first base plate, which means that: the orthographic projection of the first support structure on the first base plate does not overlap with the orthographic projection of the first region on the first base plate; or, the orthographic projection of the first support structure on the first base plate does not overlap with orthographic projections of other structures on the first base plate, besides the orthographic projection of the first region on the first base plate, and there is no specific restriction here.

It should be noted that firstly, the liquid crystal LC-V located between the first electrode and the second electrode can be a liquid crystal with low dielectric loss.

Secondly, referring to FIG. 1 and FIG. 2, the above-mentioned adjustable dielectric layer may also include one or more sealing adhesives 6 as shown in FIG. 1 and FIG. 2.

Figure 3:
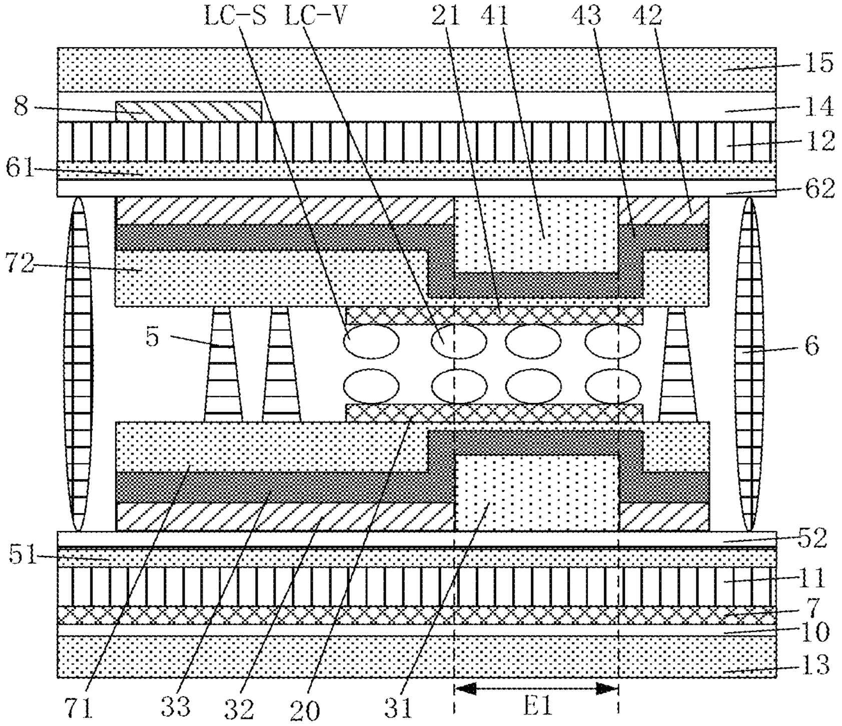
FIG. 3 is a schematic structural diagram of an antenna unit according to an embodiment of the present application.

Thirdly, the above-mentioned phase shifter can form an antenna unit as shown in FIG. 3. Referring to FIG. 3, the antenna unit further includes a ground layer 7 arranged on a side of the first base plate 11 away from the adjustable dielectric layer. An outer contour of the orthographic projection of the ground layer 7 on the second base plate 12 coincides with an outer contour of the orthographic projection of the first base plate 11 on the second base plate 12. There are no specific restrictions on the material or thickness of the ground layer. When the material of the ground layer is an opaque material, the ground layer has a reflective function, which can reflect electromagnetic waves, etc. directed towards the grounding layer from the outside, to form a reflective antenna. When the above ground layer is not provided in the antenna unit, a transmissive antenna can be formed.

Figure 4:
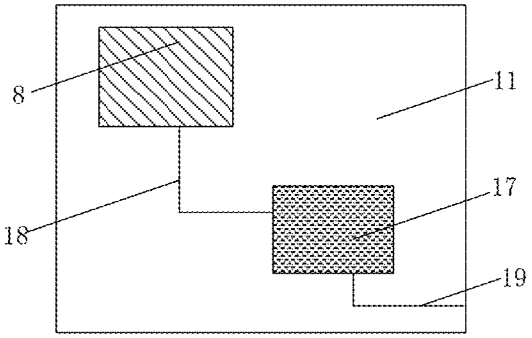
FIG. 4 is a top view of the electrical connection between a phase shifter and a radiator according to an embodiment of the present application.

Referring to FIG. 3, the antenna unit further includes at least one radiator 8 located on one side of the second base plate 12 away from the adjustable dielectric layer, and the orthographic projection of the radiator 8 on the first base plate 11 is located within the orthographic projection of the second base plate 12 on the first base plate 11. Therefore, the electromagnetic waves generated by the antenna unit can be radiated outward through the radiator, or external electromagnetic waves can be received through the radiator. The number of the radiators mentioned above can be determined based on the type of the antenna unit. Specifically, when the above antenna unit is a single polarized antenna, the number of the radiators may be one. When the above antenna unit is a dual polarized antenna, the number of the radiators may be two or one, which depends on the actual application. There is no specific restriction on the material of the radiator here. For example, the material of the radiator can include conductive metals such as copper, silver, aluminum, etc. It should be noted that, FIG. 4 is a top view of the antenna unit shown in FIG. 3, where the radiator 8 is electrically connected to the phase shifter 17 through a feeder 18, the radiator 8 emits the electromagnetic waves generated by the phase shifter 17 outward, or the radiator 8 receives the external electromagnetic waves. The phase shifter 17 in FIG. 4 includes the first electrode 31, the second electrode 41, and the dielectric as shown in FIG. 3. The phase shifter 17 is electrically connected to the controller and other structures through a transmission signal line 19, thereby receiving the voltage transmitted by the controller through the transmission signal line 19 to generate the electromagnetic waves and the like.

Referring to FIG. 3, the antenna unit further includes a first bonding layer 10 and a first reinforcement film layer 13 sequentially stacked on the side of the first base plate 11 away from the adjustable dielectric layer, as well as a second bonding layer 14 and a second reinforcement film layer 15 sequentially stacked on the side of the second base plate 12 away from the adjustable dielectric layer. There is no specific restriction on the materials of the first bonding layer and the second bonding layer mentioned above. For example, both the materials of the first bonding layer and the second bonding layer can be adhesives, such as OCA (Optically Clear Adhesive). There is no specific restriction on the types of the first reinforcement film layer and the second reinforcement film layer mentioned above. For example, the first reinforcement film layer and the second reinforcement film layer can be structures composed of common materials or composed of flexible materials, such as structures composed of metals, structures composed of PTFE (poly tetra fluoroethylene), PCB, etc. In this way, the first reinforcement film layer and the second reinforcement film layer can effectively enhance the strength of the antenna unit, and a multi-layer film bonding structure can be used to reinforce the strength of the base plate. That not only increases the design freedom, but also reduces the influence of the control lines on the antenna unit, strengthens the base plate, improves product strength, and effectively reduces the problem of fragility during the processing and transportation of large-sized samples. Furthermore, using easily commonality materials or flexible materials that can be easily adhered to reinforce the film layers can reduce the influence of mutual stress, and be further used for the reinforcement of the antenna products.

Figure 5:
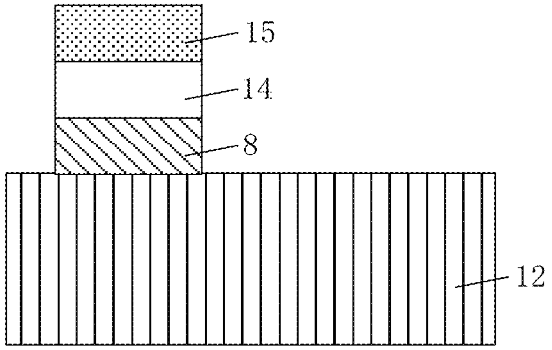
FIG. 5 is a schematic structural diagram of a radiator and a first reinforcement film layer according to an embodiment of the present application.
Figure 6:
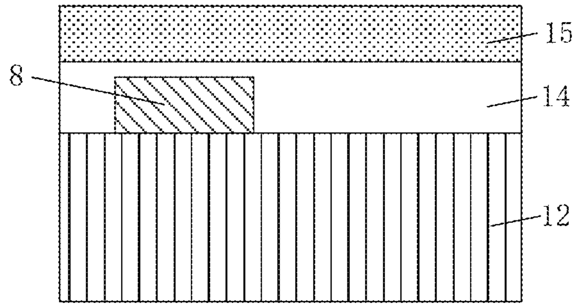
FIG. 6 is another schematic structural diagram of a radiator and a first reinforcement film layer according to an embodiment of the present application.

Referring to FIG. 5, the outer contour of the orthographic projection of the radiator 8 on the second base plate 12, the outer contour of the orthographic projection of the second bonding layer 14 on the second base plate 12, and the outer contour of the orthographic projection of the second reinforcement film layer 15 on the second base plate 12 coincide. There are no specific restrictions on the process of the second reinforcement film layer mentioned above. For example, the second reinforcement film layer mentioned above can be formed by metal patterning, the metal patterns have a small coverage area and low processing accuracy requirements. Specifically, for example, a second reinforcement film layer pattern can be made using low-loss film materials and CCL technology and attached to the surface of the second base plate, while achieving a dual effect of reducing costs and increasing strength. Alternatively, referring to FIG. 6, the outer contour of the orthographic projection of the second bonding layer 14 on the second base plate 12 coincides with the outer contour of the orthographic projection of the second reinforcing film layer 15 on the second base plate 12, and the orthographic projection of the radiator 8 on the second base plate 12 is located within the orthographic projection of the second bonding layer 14 on the second base plate 12. Thus, the second reinforcement film layer on the entire surface can be directly adhered to the surface of the second base plate by the second bonding layer according to the same size as the base plate, to achieve comprehensive reinforcement. It should be noted that, local bonding can also be used to attach the second reinforcement film layer. For example, a small area of flexible wall reinforcement can be added in regions with high stress, such as attaching a circle of the second reinforcement film layer to the edges of all four edges of the second base plate. The arrangement of the first reinforcement film layer is similar to that of the second reinforcement film layer, and will not be repeated here.

The phase shifter provided in the embodiment of the present application including: the first base plate and the second base plate, wherein the first base plate and the second base plate are arranged opposite to each other; the first electrode layer, arranged at the side of the first base plate close to the second base plate, and including the first electrode, the first control line and the first insulation part, wherein the first electrode and the first control line are electrically connected, and the first insulation part covers the first electrode and the first control line; the second electrode layer, arranged at the side of the second base plate close to the first electrode layer, and including the second electrode, the second control line and the second insulation part, wherein the second electrode and the second control line are electrically connected, and the second insulation part covers the second electrode and the second control line; along the direction perpendicular to the first base plate, the first electrode and the second electrode at least partially overlap to form the first region; and the adjustable dielectric layer, arranged between the first electrode layer and the second electrode layer, and including the first support structure, wherein the first support structure is arranged on at least one side of the first region, and the orthographic projection of the first support structure on the first base plate is at least non-overlapping with the orthographic projection of the first region on the first base plate.

In this way, on the one hand, taking the dielectric included in the adjustable dielectric layer as an example of the liquid crystal to illustrate: by inputting voltage to the first electrode through the first control line and inputting voltage to the second electrode through the second control line, the deflection angle of liquid crystal molecules in the adjustable dielectric layer can be controlled, the effective relative dielectric constant of the liquid crystal can be changed, and the phase of the phase shifter can be changed. That is, when an electric field is applied between the first electrode and the second electrode, the electric field drives the deviation of the direction of the dielectric in the adjustable dielectric layer, thereby achieving the phase shifting function of the phase shifter. On another hand, the first support structure is arranged in a non-capacitive overlapping region between the first base plate and the second base plate, which can not only provide good support, but also reduce or even eliminate the impact on the phase shifting, to achieve large phase shift amount, high uniformity of the phase shift degrees, low loss, etc. On yet another hand, the phase shifter has a simple structure and a small mass volume.

Optionally, along the direction perpendicular to the first base plate, the first electrode and the second electrode partially overlap to form the first region, and a non-overlapping part between the first electrode and the second electrode forms a second region; the orthographic projection of the first support structure on the first base plate and an orthographic projection of the second region on the first base plate are non-overlapping. Thus, the orthographic projection of the first support structure on the first base plate does not overlap with the orthographic projection of the first electrode on the first base plate and the orthographic projection of the second electrode on the first base plate, which can ensure that the first support structure is arranged in the non-capacitive overlapping region between the first base plate and the second base plate, which can not only provide good support, but also reduce or even eliminate the impact on the phase shifting, to achieve large phase shift amount, high uniformity of the phase shift degrees, low loss, etc.

Optionally, referring to FIG. 1 and FIG. 2, along the direction perpendicular to the first base plate 11, the first electrode 31 and the second electrode 41 completely overlap to form the first region E1. That can ensure that the first support structure is arranged in the non-capacitive overlapping region between the first base plate and the second base plate, which can not only provide good support, but also reduce or even eliminate the impact on the phase shifting, to achieve large phase shift amount, high uniformity of the phase shift degrees, low loss, etc., while being simple and easy to implement.

Optionally, in a first direction (OA direction as shown in FIGS. 1 and 2) and a second direction (OB direction as shown in FIGS. 1 and 2), spacings between the orthographic projection of the first support structure 5 on the first base plate 11 and the orthographic projection of the first region E1 on the first base plate 11 are greater than or equal to 400 μm; among them, the first direction (OA direction as shown in FIGS. 1 and 2) is perpendicular to the second direction (OB direction as shown in FIGS. 1 and 2).

There is no specific restriction on the spacings between the orthographic projection of the first support structure on the first base plate and the orthographic projection of the first region on the first base plate in both the first direction and the second direction. For example, the spacings between the orthographic projection of the first support structure on the first base plate and the orthographic projection of the first region on the first base plate in both the first direction and the second direction can be 401 μm, 500 μm, 600 μm or 700 μm and so on.

In the phase shifter provided in the embodiment of the present application, the spacing between the first support structure and the first region in any direction is set to be greater than or equal to 400 μm. Thus, the electrode pattern can occupy a larger proportion of the area in the phase shifter while ensuring the uniformity of the intra box gap between the first base plate and the second base plate. That ensures the antenna performance of the phase shifter while greatly compressing the designable space of the first support structure, resulting in miniaturization of the phase shifter.

Optionally, referring to FIG. 1 and FIG. 2, the adjustable dielectric layer further includes a first orientation part 20 and a second orientation part 21, the first orientation part 20 is located at a side of the first insulation part 33 away from the first electrode 31, and the second orientation part 21 is located at a side of the second insulation part 43 away from the second electrode 41; and a height g1 of the first support structure 5 along the direction perpendicular to the first base plate 11 satisfies g1=h1+h2+h3−h4−h5; among them, h1 is a height g1 of the first electrode 31 along the direction perpendicular to the first base plate 11, h2 is a height g1 of the second electrode 41 along the direction perpendicular to the first base plate 11, h3 is a spacing between the first base plate 11 and the second base plate 12 along the direction perpendicular to the first base plate 11, h4 is a height g1 of the first orientation part 20 along the direction perpendicular to the first base plate 11, and h5 is a height g1 of the second orientation part 21 along the direction perpendicular to the first base plate 11. If the height of the first support structure along the direction perpendicular to the first base plate is too small to achieve a good box thickness gap, and if the height of the first support structure along the direction perpendicular to the first base plate is too large, the orientation liquid cannot be retained in the actual process, resulting in complex preparation of the orientation part. Therefore, the present application sets the first support structure having the height g1=h1+h2+h3−h4−h5 along the direction perpendicular to the first base plate, which can achieve good box thickness gap and retain the orientation liquid to obtain the orientation part, achieving the uniformity of the intra box gap between the first base plate and the second base plate.

The first orientation part and the second orientation part mentioned above can be used to limit the initial deflection angle of the liquid crystal molecules in the adjustable dielectric layer. When no electric field is applied between the first electrode 31 and the second electrode 41 in FIG. 1 and FIG. 2, the liquid crystal molecule LC-V can be arranged in a preset direction under the action of the first orientation part and the second orientation part.

Figure 7:
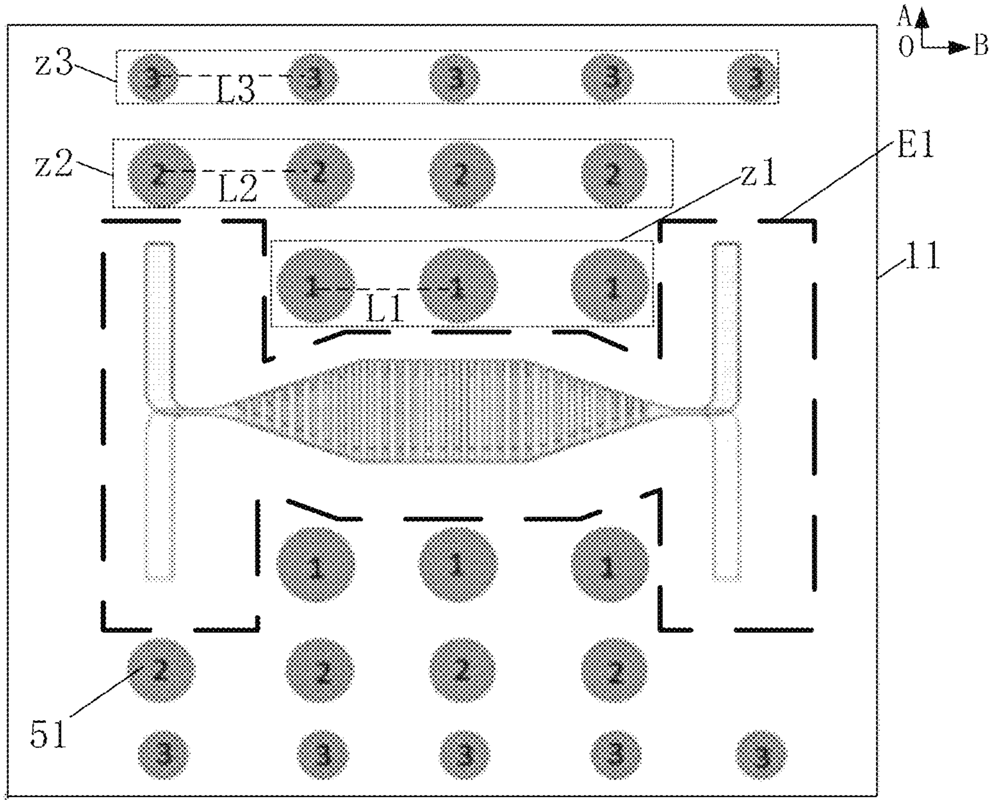
FIG. 7 is a top view of a first type of first support structure according to an embodiment of the present application.

Optionally, referring to FIG. 1, FIG. 2 and FIG. 7, the first support structure 5 includes a plurality of support columns 51, adjacent support columns 51 are arranged at an interval; all of the support columns 51 are divided into a plurality of support groups, each support group includes the plurality of support columns 51; and at least one side of the first region E1 is provided with the plurality of support groups, the plurality of support groups located at a same side of the first region E1 are sorted in the first direction (OA direction shown in FIGS. 1, 2 and 7), the support group located in a first sequence is a first support group z1, the support group located in a last sequence is a second support group z3 as shown in FIG. 7; an area of orthographic projections of the support columns 51 in the first support group z1 on the first base plate 11 is greater than an area of orthographic projections of the support columns 51 in the second support group z3 on the first base plate 11; within a unit area, a distribution density of the support columns 51 in the first support group z1 is less than a distribution density of the support columns 51 in the second support group z3.

There is no specific restriction on the shape of the above support columns. For example, the shape of the support columns can include a cylinder, a regular trapezoidal column, an inverted trapezoidal column, a rectangle, etc. When the shape of the support columns is the cylinder, the shape of the orthographic projection of the support columns on the first base plate is a circle.

Among the plurality of support columns included in each support group, the shapes of the plurality of support columns can all be the same. Alternatively, the shapes of the plurality of support columns can all be different. Alternatively, the shapes of the plurality of support columns can be partially the same, without specific restrictions here. FIG. 7 takes all of the shapes of the plurality of support columns 51 included in each support group being the same, and the shape of the orthographic projection of each support column 51 on the first base plate 11 being a circle as an example to illustrate.

The spacings between the geometric centers of adjacent support columns among the plurality of support columns in each support group mentioned above are not specifically limited. For example, when each support group includes three or more support columns, the spacings between the geometric centers of adjacent support columns in each support group can all be the same. Alternatively, the spacings between the geometric centers of adjacent support columns in each support group can all be different. Alternatively, the spacings between the geometric centers of adjacent support columns in each support group can be partially the same. FIG. 7 takes the spacings between the geometric centers of adjacent support columns 51 in each support group all being the same as an example to illustrate.

In the plurality of support groups mentioned above, the spacings between the geometric centers of adjacent support columns in different support groups are not specifically limited. For example, when three or more support groups are included, the spacings between the geometric centers of adjacent support columns in each support group can be the same as the spacings between the geometric centers of adjacent support columns in the other support groups. Alternatively, the spacings between the geometric centers of adjacent support columns in each support group can be different from the spacings between the geometric centers of adjacent support columns in the other support groups. Alternatively, the spacings between the geometric centers of adjacent support columns in each support group can be partially the same as the spacings between the geometric centers of adjacent support columns in the other support groups. FIG. 7 takes the spacings between the geometric centers of adjacent support columns in different support groups being the same as an example to illustrate, specifically, the spacing L1 between the geometric centers of adjacent support columns 51 in the first support group z1, the spacing L3 between the geometric centers of adjacent support columns 51 in the second support group z3, and the spacing L2 between the geometric centers of adjacent support columns 51 in the third support group z2 are all the same.

At least one side of the first region is provided with the plurality of support groups, which means that: one side of the first region is provided with the plurality of support groups; or, multiple sides of the first region are provided with the plurality of support groups, which is not specifically limited here.

There is no specific restriction on the number of the plurality of support groups provided on at least one side of the first region mentioned above. For example, the plurality of support groups provided on at least one side of the first region can only include the first support group and the second support group. Alternatively, the plurality of support groups provided on at least one side of the first region may also include other support groups, besides the first support group and the second support group, and the number of the other support groups may be one or more. The area of the orthographic projection of the support columns in the other support groups on the first base plate can be the same as the area of the orthographic projection of the support columns in the first support group on the first base plate. Alternatively, the area of the orthographic projection of the support columns in the other support groups on the first base plate can be the same as the area of the orthographic projection of the support columns in the second support group on the first base plate. Alternatively, the area of the orthographic projection of the support columns in the other support groups on the first base plate can be different from the area of the orthographic projection of the support columns in the first support group on the first base plate and the area of the orthographic projection of the support columns in the second support group on the first base plate. Alternatively, the area of the orthographic projection of the support columns in the other support groups on the first base plate can be partially the same as either the area of the orthographic projection of the support columns in the first support group on the first base plate or the area of the orthographic projection of the support columns in the second support group on the first base plate, which is not specifically limited here.

In the phase shifter provided in the embodiment of the present application, the plurality of support groups are provided at a position whose spacing with the first region in any direction being greater than or equal to 400 μm. On the one hand, the electrode pattern can occupy a larger proportion of the area in the phase shifter while ensuring the uniformity of the intra box gap between the first base plate and the second base plate. That ensures the antenna performance of the phase shifter while greatly compressing the designable space of the first support structure, resulting in miniaturization of the phase shifter. On the other hand, the support columns will be set according to the shape of the first region, since the density per unit area of the support columns in the first support group arranged close to the first region is less than the density per unit area of the support columns in the second support group arranged away from the first region, the area of the orthographic projection of the support columns in the first support group on the first base plate is greater than the area of the orthographic projection of the support columns in the second support group on the first base plate, to ensure the support performance of the box thickness gap.

Optionally, referring to FIG. 1, FIG. 2 and FIG. 7, the support group located in a middle sequence is a third support group z2; and along a direction from the first support group z1 to the second support group z3, an area of orthographic projections of the support columns 51 in each support group on the first base plate 11 decreases sequentially; within a unit area, a distribution density of the support columns 51 in each support group increases sequentially. That can maintain good support on one side of the first region while being simple and easy to implement.

There is no specific restriction on the number of the third support group mentioned above. For example, the third support group can be one group; or, the third support group can be a plurality of groups.

FIG. 7 takes the shapes of the plurality of support columns 51 included in the first support group z1, the third support group z2, and the second support group z3 being the same, and the shape of the orthographic projection of each support column 51 on the first base plate 11 being a circle as an example to illustrate.

Optionally, referring to FIG. 1, FIG. 2 and FIG. 7, along the first direction (OA direction shown in FIGS. 1, 2 and 7), the first support structures 5 are arranged at two sides of the first region E1, and are mirror symmetrical about the first region E1; a side of the first region E1 is provided with one first support group z1, one second support group z3 and one third support group z2, the support columns 51 in each support group are arranged along the second direction (OB direction shown in FIGS. 1, 2 and 7), and the area of the orthographic projections of the support columns 51 in each support group on the first base plate 11 is the same; spacings between geometric centers of adjacent support columns 51 in each support group are the same, and are the same as spacings between geometric centers of adjacent support columns 51 in the other support groups; a shape of the orthographic projections of the support columns 51 in each support group on the first base plate 11 is a circle, and a radius range of the circle includes 20-200 μm; and a height range of the support columns 51 in each support group along the direction perpendicular to the first base plate 11 includes 5-50 μm. So that both sides of the first region can maintain good support performance, and the proportion area of the first support group/the area of phase shifter can be greater than 2500 μm²/mm², which ensures the support performance of the box thickness gap between the first base plate and the second base plate, and maintains high consistency in the box thickness between the first base plate and the second base plate.

The first support structures are arranged at two sides of the first region, and are mirror symmetrical about the first region, which means that: along the OA direction, the numbers and the arrangements of the first support groups at two sides of the first region are the same, and the spacings between the first support groups at two sides of the first region and the first region are also the same. In FIG. 7, the spacing between the first support group z1 arranged on each side of the first region E1 and the first region E1 is the same, the spacing between the second support group z3 arranged on each side of the first region E1 and the first region E1 is the same, and the spacing between the third support group z2 arranged on each side of the first region E1 and the first region E1 is the same.

FIG. 7 takes the case as an example to illustrate, in which the first support group z1 includes three support columns 51 and the spacings L1 between the geometric centers of adjacent support columns 51 in the first support group z1 are the same, the second support group z3 includes five support columns 51 and the spacings L3 between the geometric centers of adjacent support columns 51 in the second support group z3 are the same, the third support group z2 includes four support columns 51 and the spacings L2 between the geometric centers of adjacent support columns 51 in the third support group z2 are the same.

There is no specific restriction on the radius of the circle as the shape of the orthographic projection of each support column 51 on the first base plate 11. For example, the radius of the circle as the shape of the orthographic projection of each support column 51 on the first base plate 11 can be 20 μm, 50 μm, 100 μm or 200 μm and so on.

There is no specific restriction on the height of the support columns in each support group along the direction perpendicular to the first base plate. For example, the height of the support columns in each support group along the direction perpendicular to the first base plate can be 5 μm, 10 μm, 20 μm, 30 μm, 40 μm or 50 μm and so on.

It should be noted that, as shown in FIG. 7, the support columns in the first support group z1 is also marked as 1, the support columns in the second support group z3 is also marked as 3, and the support columns in the third support group z2 is also marked as 2.

Optionally, referring to FIG. 1, FIG. 2 and FIG. 7, in the second direction (OB direction shown in FIGS. 1, 2 and 7), connecting lines of the geometric centers of the plurality of support columns 51 in the first support group z1 are in a straight line, connecting lines of the geometric centers of the plurality of support columns 51 in the second support group z3 are in a straight line, and connecting lines of the geometric centers of the plurality of support columns 51 in the third support group z2 are in a straight line; the connecting lines of the geometric centers of the plurality of support columns 51 in the first support group z1, the connecting lines of the geometric centers of the plurality of support columns 51 in the second support group z3 and the connecting lines of the geometric centers of the plurality of support columns 51 in the third support group z2 are all parallel.

In the first direction (OA direction shown in FIGS. 1, 2 and 7) and the second direction (OB direction shown in FIGS. 1, 2 and 7), the spacings between the orthographic projection of the first support group z1 on the first base plate 11 and the orthographic projection of the first region E1 on the first base plate 11 are greater than 400 μm, spacings between an orthographic projection of the third support group z2 on the first base plate 11 and the orthographic projection of the first support group z1 on the first base plate 11 are greater than 500 μm, and spacings between an orthographic projection of the second support group z3 on the first base plate 11 and the orthographic projection of the third support group z2 on the first base plate 11 are greater than 600 μm. So that the proportion area of the first support group/the area of phase shifter can be greater than 2500 μm²/mm², which ensures the support performance of the box thickness gap between the first base plate and the second base plate, and maintains high consistency in the box thickness between the first base plate and the second base plate.

There is no specific restriction on the spacing between the orthographic projection of the first support group on the first base plate and the orthographic projection of the first region on the first base plate. For example, the spacing between the orthographic projection of the first support group on the first base plate and the orthographic projection of the first region on the first base plate can be 401 μm, 500 μm, 600 μm or 700 μm and so on.

There is no specific restriction on the spacing between the orthographic projection of the third support group on the first base plate and the orthographic projection of the first support group on the first base plate. For example, the spacing between the orthographic projection of the third support group on the first base plate and the orthographic projection of the first support group on the first base plate can be 501 μm, 600 μm, 700 μm or 800 μm and so on.

There is no specific restriction on the spacing between the orthographic projection of the second support group on the first base plate and the orthographic projection of the third support group on the first base plate. For example, the spacing between the orthographic projection of the second support group on the first base plate and the orthographic projection of the third support group on the first base plate can be 601 μm, 700 μm, 800 μm or 900 μm and so on.

There is no specific restriction on the area of the orthographic projection of each support column in the first support group on the first base plate. For example, as shown in FIG. 7, when the shape of the orthographic projection of each support column 51 in the first support group on the first base plate 11 is a circle, the diameter range of the circle of each support column in the first support group on the first base plate can include 90-110 μm. Specifically, the diameter of the circle of each support column in the first support group on the first base plate can be 90 μm, 100 μm or 110 μm and so on.

There is no specific restriction on the area of the orthographic projection of each support column in the second support group on the first base plate. For example, as shown in FIG. 7, when the shape of the orthographic projection of each support column 51 in the second support group on the first base plate 11 is a circle, the diameter range of the circle of each support column in the second support group on the first base plate can include 30-50 μm. Specifically, the diameter of the circle of each support column in the second support group on the first base plate can be 30 μm, 40 μm or 50 μm and so on.

There is no specific restriction on the area of the orthographic projection of each support column in the third support group on the first base plate. For example, as shown in FIG. 7, when the shape of the orthographic projection of each support column 51 in the third support group on the first base plate 11 is a circle, the diameter range of the circle of each support column in the third support group on the first base plate can include 60-80 μm. Specifically, the diameter of the circle of each support column in the third support group on the first base plate can be 60 μm, 70 μm or 80 μm and so on.

Optionally, referring to FIG. 1-FIG. 2, and FIG. 8-FIG. 10, the first support structure 5 at least includes a support part 52, and the support part 52 is patterned and arranged surrounding the first region E1; and the support part 52 includes a plurality of first patterns 521 (FIGS. 8-10), adjacent first patterns 521 are arranged at an interval, and orthographic projections of the plurality of first patterns 521 on the first base plate 11 are at least partially the same. In this way, on the one hand, by patterning the support part, the support environment around the first region can be further optimized to ensure that the support force around the first region is almost consistent. On the other hand, adjacent first patterns are arranged at an interval, so that the patterned support part cannot completely wrap around the first region by interrupting the pattern of the support part, and a flow channel for the dielectrics is reserved for subsequent infusion of the dielectric.

The first support structure at least includes a support part, which means that: the first support structure includes the support part; or, the first support structure also includes other structures besides the support part, such as the support column, which is not specifically limited here.

The support part is arranged surrounding the first region, and at this time, the support part can be arranged surrounding a part of the first region; or, the support part can be arranged completely surrounding the first region, which is not specifically limited here.

Figure 8:
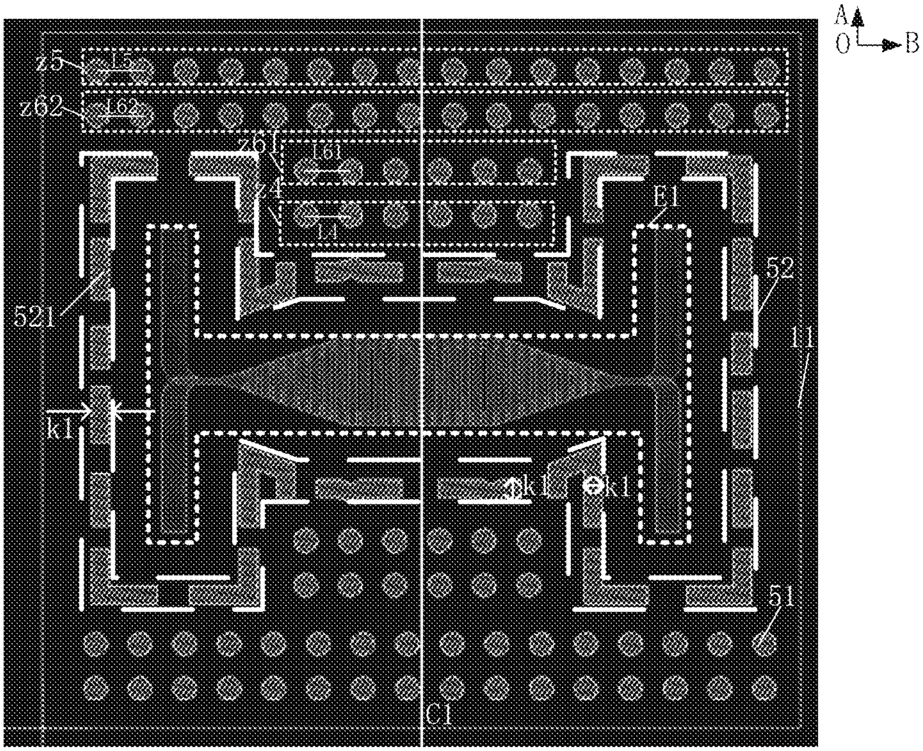
FIG. 8 is a top view of a second type of first support structure according to an embodiment of the present application.
Figure 9:
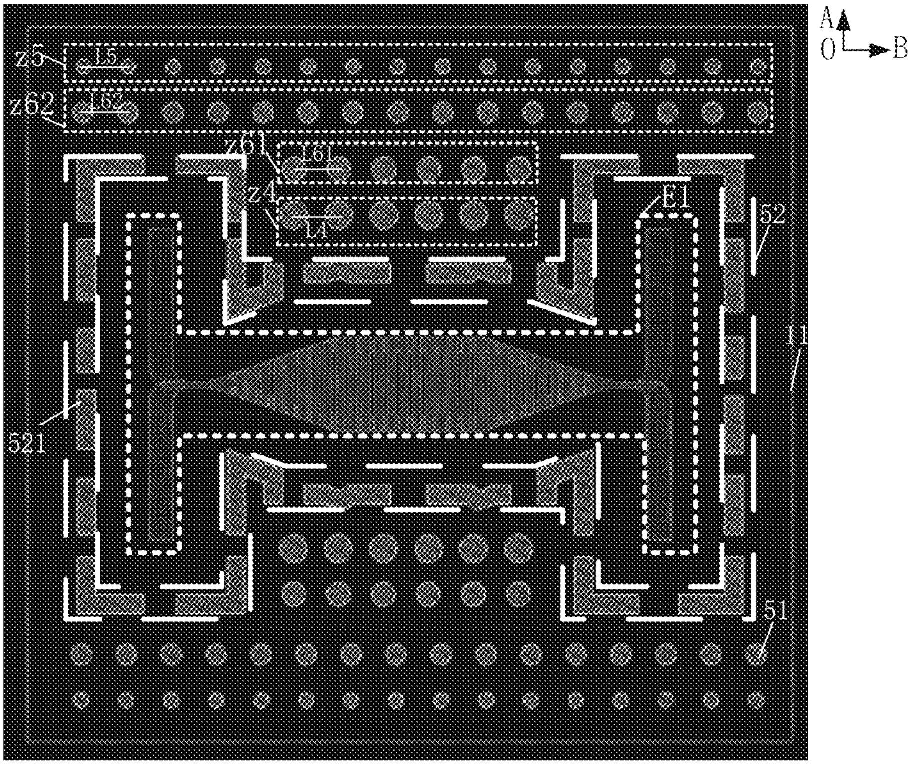
FIG. 9 is a top view of a third type of first support structure according to an embodiment of the present application.
Figure 10:
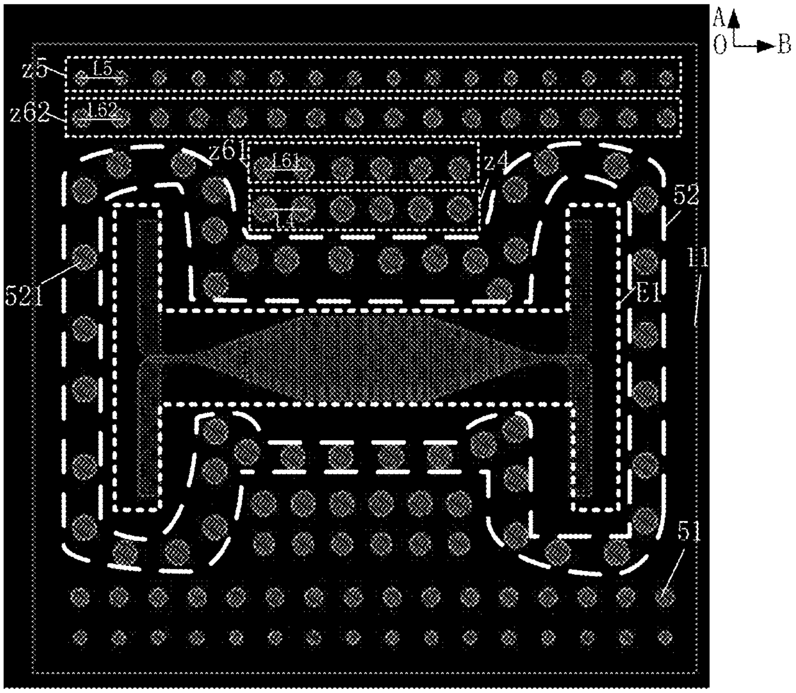
FIG. 10 is a top view of a fourth type of first support structure according to an embodiment of the present application.

The orthographic projections of the plurality of first patterns on the first base plate are at least partially the same, which means that: as shown in FIG. 8-FIG. 9, the orthographic projections of the plurality of first patterns 521 on the first base plate 11 are partially the same. Alternatively, as shown in FIG. 10, the orthographic projections of the plurality of first patterns 521 on the first base plate 11 are all the same. It should be noted that, the orthographic projections of the plurality of first patterns on the first base plate are all different, which depends on actual needs. The orthographic projections of plurality of first patterns on the first base plate being same includes that the shapes and the areas of the orthographic projections of the first patterns on the first base plate are the same, respectively.

There is no specific restriction on the width of the patterned support part mentioned above. For example, the widths of the patterned support part along the first direction and the second direction can be the same. Alternatively, the widths of the patterned support part along the first direction and the second direction can be different. As shown in FIG. 8, the patterned support part 52 has the same width kl along the OA direction and the OB direction, and the range of kl can include 20-200 μm. Specifically, kl can be 20 μm, 70 μm, 100 μm, 150 μm or 200 μm and so on.

Optionally, referring to FIG. 8-FIG. 10, the support part 52 is arranged completely surrounding the first region E1; in the first direction (OA direction shown in FIGS. 8-10) and the second direction (OB direction shown in FIGS. 8-10), spacings between an orthographic projection of the support part 52 on the first base plate 11 and the orthographic projection of the first region E1 on the first base plate 11 are equal to 400 μm; and the first region E1 and the support part 52 are both symmetrical about the first axis C1; a range of the spacing between the orthographic projection of the first support group on the first base plate 11 and the orthographic projection of the first region E1 on the first base plate 11 includes 600-2000 μm. In this way, on the one hand, by patterning the support part completely surrounding the first region, the support environment around the first region can be further optimized to ensure that the support force around the first region is almost consistent. On the other hand, the patterned support part is arranged at a position having a spacing with the first region of 400 μm and matching the shape of the first region, it can ensure uniform support force in any direction, thereby ensuring a constant spacing between the first electrode and the second electrode in the 360° box between the first base plate and the second base plate.

Figure 11:
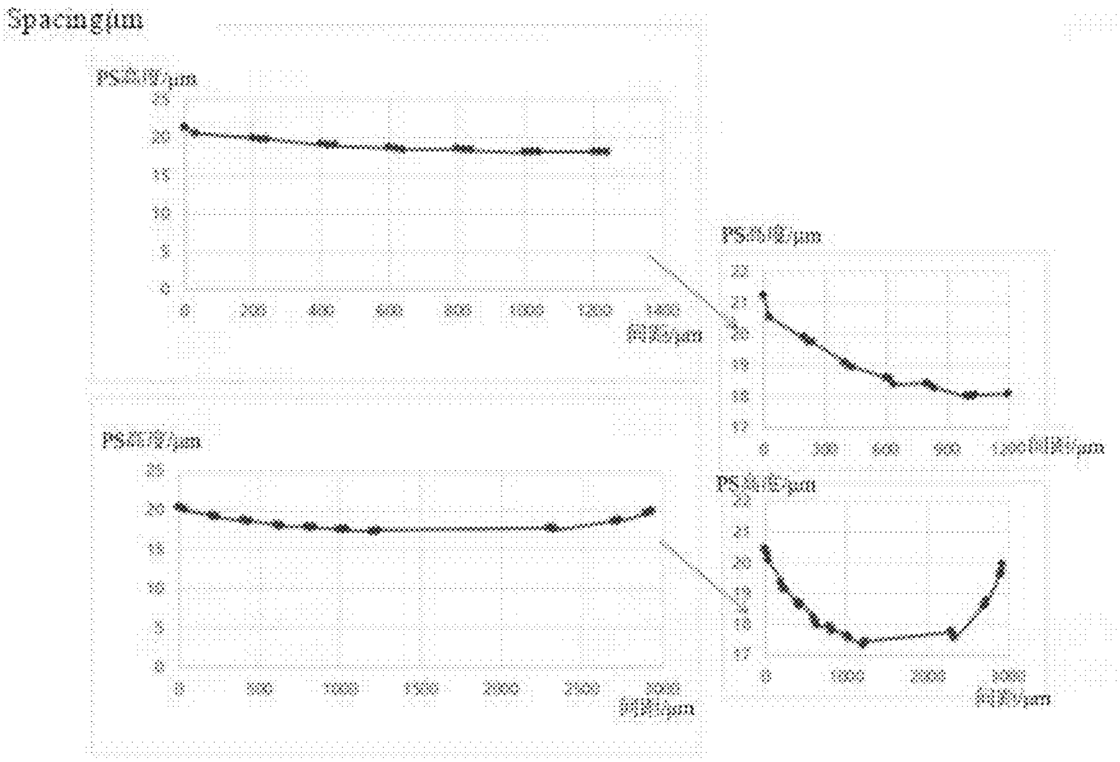
FIG. 11 is a chart of a height of a PS (Photo Spacer, first support structure) along a direction perpendicular to the first base plate changing with a spacing between an orthographic projection of the PS on the first base plate and an orthographic projection of a first region on the first base plate.

There is no specific restriction on the spacings between the orthographic projection of the first support structure on the first base plate and the orthographic projection of the first region on the first base plate in the first direction and the second direction. For example, in the first direction and the second direction, the spacings between the orthographic projection of the first support structure on the first base plate and the orthographic projection of the first region on the first base plate can be 600 μm, 800 μm, 1000 μm, 1500 μm or 2000 μm and so on. FIG. 11 shows a chart of the height of PS (Photo Spacer, first support structure) along the direction perpendicular to the first base plate changing with the spacing between the orthographic projection of PS on the first base plate and the orthographic projection of the first region on the first base plate. As shown in FIG. 11, the abscissa represents the spacings in μm between the orthographic projection of PS in μm on the first base plate and the orthographic projection of the first region on the first base plate, in units of μm. The vertical axis is the height of PS along the direction perpendicular to the first substrate, in units of μm. When a range of the spacing between the orthographic projection of PS on the first base plate and the orthographic projection of the first region on the first base plate is 600-2000 μm, the height variation curve of PS along the direction perpendicular to the first base plate is relatively smooth, and the height of PS can be maintained at 19 μm.

Optionally, referring to FIG. 8 and FIG. 9, shapes of the orthographic projections of the plurality of first patterns 521 on the first base plate 11 includes rectangles and irregular polygons, and areas of the rectangles are at least partially different from areas of the irregular polygons. Thus, it can better match the shape of the first region and be simple and easy to implement.

The areas of the rectangles are at least partially different from the areas of the irregular polygons, which means that: the areas of the rectangles are partially different from the areas of the irregular polygons; or, the areas of the rectangles are all different from the areas of the irregular polygons, which is not specifically limited here.

There is no specific restriction on the number and area of the rectangles included in the orthographic projection of the plurality of first patterns on the first base plate. For example, the orthographic projection of the plurality of first patterns on the first base plate can include a plurality of rectangles, and the areas of the plurality of rectangles can be the same. Alternatively, the areas of the plurality of rectangles can all be different. Alternatively, the areas of the plurality of rectangles can be partially the same.

There is no specific restriction on the number, area, shape, etc. of the irregular polygons included in the orthographic projection of the plurality of first patterns on the first base plate. For example, the orthographic projection of the plurality of first patterns on the first base plate can include a plurality of irregular polygons, and the areas and shapes of the plurality of irregular polygons can both be the same. Alternatively, the areas and shapes of the plurality of irregular polygons can both be different. Alternatively, the areas and shapes of the plurality of irregular polygons can both be partially the same. Alternatively, the areas of the plurality of irregular polygons can all be the same, and the shapes of the plurality of irregular polygons may be completely different or partially different. Alternatively, the shapes of the plurality of irregular polygons can all be the same, and the areas of the plurality of irregular polygons may be completely different or partially different.

Or, optionally, referring to FIG. 10, the shapes of the orthographic projections of the plurality of first patterns 521 on the first base plate 11 includes circles, areas of the circles are the same. Thus, the support column can be formed by a cylindrical first pattern, which can leave enough channels for crystal infusion of high viscosity liquid crystal and achieve better support effect through the cylindrical first support structure.

Optionally, referring to FIG. 1, FIG. 2 and FIG. 8, the first support structure 5 further includes a plurality of support columns 51, adjacent support columns 51 are arranged at an interval; all of the support columns 51 are divided into a plurality of support groups, and each support group includes the plurality of support columns 51; and at least one side of the support part 52 is provided with the plurality of support groups, the plurality of support groups located at a same side of the support part 52 are sorted in the first direction (OA direction shown in FIGS. 1, 2 and 8), the support group located in a first sequence is a fourth support group z4, the support group located in a last sequence is a fifth support group z5, and the support group located in a middle sequence is a sixth support group (the sixth support group in FIGS. 1, 2 and 8 includes two groups, that is, a support group z61 and a support group z62); areas and shapes of the orthographic projections of the support columns 51 in each support group on the first base plate 11 are both the same. Thus, it is possible to ensure the uniformity of the intra box gap between the first base plate and the second base plate through the plurality of support groups on the periphery of the support part. At the same time, the electrode pattern can occupy a larger proportion of the area in the phase shifter, which not only ensures the antenna performance of the phase shifter but also compresses the designable space of the first support structure, thus making the phase shifter miniaturized and simple to implement.

There is no specific restriction on the shape of the above supporting columns. For example, the shape of the above supporting columns can include a cylinder, a regular trapezoidal column, an inverted trapezoidal column, a rectangle, etc. When the shape of the support columns is the cylinder, the shape of the orthographic projection of the support columns on the first base plate is a circle. FIG. 8 takes the shape of the orthographic projection of the plurality of support columns 51 included in each support group on the first base plate 11 being a circle as an example to illustrate.

The spacings between the geometric centers of adjacent support columns among the plurality of support columns in each support group are not specifically limited. For example, when each support group includes three or more support columns, the spacings between the geometric centers of adjacent support columns in each support group can all be the same. Alternatively, the spacings between the geometric centers of adjacent support columns in each support group can all be different. Alternatively, the spacings between the geometric centers of adjacent support columns in each support group can be partially the same. FIG. 8 takes the spacings between the geometric centers of adjacent support columns 51 in each support group all being the same as an example to illustrate.

In the plurality of support groups, the spacings between the geometric centers of adjacent support columns in different support groups are not specifically limited. For example, when three or more support groups are included, the spacings between the geometric centers of adjacent support columns in each support group can all be the same as the spacings between the geometric centers of adjacent support columns in other support groups. Alternatively, the spacings between the geometric centers of adjacent support columns in each support group can all be different from the spacings between the geometric centers of adjacent support columns in other support groups. Alternatively, the spacings between the geometric centers of adjacent support columns in each support group can be partially the same as the spacings between the geometric centers of adjacent support columns in other support groups. FIG. 8 takes the spacings between the geometric centers of adjacent support columns 51 in different support groups being the same as an example to illustrate, specifically, the spacing L4 between the geometric centers of support columns 51 in the fourth support group, the spacing L5 between the geometric centers of support columns 51 in the fifth support group, the spacing L61 between the geometric centers of support columns 51 in the support group z61 of the sixth support group, and the spacing L62 between the geometric centers of support columns 51 in the support group z62 of the sixth support group are all the same.

At least one side of the support part is provided with the plurality of support groups, which means that: one side of the support part is provided with the plurality of support groups; or, the multiple sides of the support part are provided with the plurality of support groups, which is not specifically limited here.

Optionally, referring to FIG. 1, FIG. 2 and FIG. 9-FIG. 10, the first support structure 5 further includes a plurality of support columns 51, adjacent support columns 51 are arranged at an interval; all of the support columns 51 are divided into a plurality of support groups, and each support group includes the plurality of support columns 51; and at least one side of the support part 52 is provided with the plurality of support groups, the plurality of support groups located at a same side of the support part 52 are sorted in the first direction (OA direction shown in FIGS. 1, 2, 9 and 10), the support group located in a first sequence is a fourth support group z4, the support group located in a last sequence is a fifth support group z5, and the support group located in a middle sequence is a sixth support group (the sixth support group in FIGS. 1, 2, 9 and 10 includes two groups, that is, a support group z61 and a support group z62); along a direction from the fourth support group z4 to the fifth support group z5, an area of orthographic projections of the support columns 51 in each support group on the first base plate 11 decreases sequentially. So that the proportion area of the first support group/the area of phase shifter can be greater than 2500 $\mu m^2/mm^2$, which improves the support force of the first support structure, and ensures the support performance of the box thickness gap between the first base plate and the second base plate.

Among the plurality of support columns included in each support group, the shapes of the plurality of support columns can all be the same. Alternatively, the shapes of the plurality of support columns can all be different. Alternatively, the shapes of the plurality of supporting columns can be partially the same, which is not specifically limited here.

There is no specific restriction on the number of the sixth support groups mentioned above. For example, the sixth support group can be one group; or, the sixth support groups can be multiple groups. When the sixth support group is one group, the areas of the orthographic projections of the support columns in the sixth support group on the first base plate can be the same as the areas of the orthographic projections of the support columns in the fourth support group on the first base plate. Alternatively, the areas of the orthographic projections of the support columns in the sixth support group on the first base plate can be the same as the areas of the orthographic projections of the support columns in the fifth support group on the first base plate.

When the sixth support groups are multiple groups, the areas of the orthographic projections of the support columns in each sixth support group on the first base plate can be the same as the areas of the orthographic projections of the support columns in the fourth support group on the first base plate. Alternatively, the areas of the orthographic projections of the support columns in each sixth support group on the first base plate can be the same as the areas of the orthographic projections of the support columns in the fifth support group on the first base plate. Alternatively, the areas of the orthographic projections of the support columns in each sixth support group on the first base plate can be all different from the areas of the orthographic projections of the support columns in the fourth support group on the first base plate and/or the areas of the orthographic projections of the support columns in the fifth support group on the first base plate. Alternatively, the areas of the orthographic projections of the support columns in each sixth support group on the first base plate can be partially the same as the areas of the orthographic projections of the support columns in the fourth support group on the first base plate and/or the areas of the orthographic projections of the support columns in the fifth support group on the first base plate, which is not specifically limited here.

FIG. 9 and FIG. 10 takes the case as an example to illustrate, in which, the shapes of the plurality of support columns 51 included in the fourth support group z4, the fifth support group z5, the sixth support group (the support group z61 and the support group z62) are all the same, and the shape of the orthographic projection of each support columns on the first base plate is a circle; the fourth support group z4 includes six support columns 51 and the spacings L4 between the geometric centers of adjacent support columns 51 in the fourth support group z4 are the same, the fifth support group z5 includes sixteen support columns 51 and the spacings L5 between the geometric centers of adjacent support columns 51 in the fifth support group z5 are the same, the support group z61 includes six support columns 51 and the spacings L61 between the geometric centers of adjacent support columns 51 in the support group z61 are the same, the support group z62 includes sixteen support columns 51 and the spacings L62 between the geometric centers of adjacent support columns 51 in the support group z62 are the same; in the second direction (OB direction shown in FIGS. 9 and 10), connecting lines of the geometric centers of the plurality of support columns 51 in the fourth support group z4 are in a straight line, connecting lines of the geometric centers of the plurality of support columns 51 in the fifth support group z5 are in a straight line, connecting lines of the geometric centers of the plurality of support columns 51 in the support group z61 are in a straight line, and connecting lines of the geometric centers of the plurality of support columns 51 in the support group z62 are in a straight line; the connecting lines of the geometric centers of the plurality of support columns 51 in the fourth support group z4, the connecting lines of the geometric centers of the plurality of support columns 51 in the fifth support group z5, the connecting lines of the geometric centers of the plurality of support columns 51 in the support group z61 and the connecting lines of the geometric centers of the plurality of support columns 51 in the support group z62 are all parallel.

Optionally, a material of the first electrode includes copper, and a thickness range of the first electrode along the direction perpendicular to the first base plate includes 0.5-10 μm; and a material of the second electrode includes copper, and a thickness range of the second electrode along a direction perpendicular to the second base plate includes 0.5-10 μm. Therefore, Cu with a certain thickness (0.5-10 μm) is regarded as an electrode for forming overlapping capacitors, which makes the resistance of both the first electrode and the second electrode lower, thereby reducing the loss of electromagnetic wave signals in the phase shifter, which is beneficial for reducing the loss of the antenna units using the phase shifter, and improving the performance of the antenna units using the phase shifter.

There is no specific restriction on the thickness of the first electrode in the direction perpendicular to the first base plate. For example, the thickness of the first electrode in the direction perpendicular to the first base plate can be 0.5 μm, 1 μm, 3 μm, 4.6 μm, 6 μm, 8 μm or 10 μm and so on.

There is no specific restriction on the thickness of the second electrode in the direction perpendicular to the first base plate. For example, the thickness of the second electrode in the direction perpendicular to the first base plate can be 0.5 μm, 1 μm, 3 μm, 4.6 μm, 6 μm, 8 μm or 10 μm and so on.

Optionally, referring to FIG. 2, along the direction perpendicular to the first base plate 11, a thickness d11 of an overlapping part between the first insulation part 33 and the first electrode 31 is less than a thickness d12 of an overlapping part between the first insulation part 33 and the first control line 32, and a thickness d21 of an overlapping part between the second insulation part 43 and the second electrode 41 is less than a thickness d22 of an overlapping part between the second insulation part 43 and the second control line 42.

It should be noted that, as shown in FIG. 1, along the direction perpendicular to the first base plate 11, the thickness of the overlapping part between the first insulation part 33 and the first electrode 31 is equal to the thickness of the overlapping part between the first insulation part 33 and the first control line 32, and the thickness of the overlapping part between the second insulation part 43 and the second electrode 41 is equal to the thickness of the overlapping part between the second insulation part 43 and the second control line 42. That is to say, the thicknesses of the first insulation part and the second insulation part are uniform at this time.

In the phase shifter provided in the embodiment of the present application, the first insulation part covered on the first electrode and the second insulation part covered on the second electrode are thinner than the insulation parts at other positions. In this way, on the one hand, the electrode can be wrapped by the insulation part to prevent oxidation of the electrode. On another hand, the dielectric constant of the insulation part is relatively large, and under an external electric field, induced charges may be generated to weaken the electric field that should be superimposed on the liquid crystal. The thicker the insulation part, the larger the driving voltage of the liquid crystal, resulting in increased power consumption. In addition, high-frequency microwaves need to pass through the insulation part during the transmission in the control line. If the insulation part is very thick and uneven/with many impurities, the microwave phase may shift, the wave speed may decrease, and some distortion, dispersion, and other problems may occur. Therefore, by thinning the insulation part above the electrode, the waveform and wave speed of the high-frequency microwave can be maintained better when passing through the insulation part, with lower losses, and the driving voltage of the liquid crystal can be significantly reduced. On yet another hand, it can reduce the height of the step edge between the region with electrodes and the region without electrodes, which is more conducive to the subsequent coating of the film layer. For example, the flat layer can be coated more evenly, and it can also make the liquid crystal orientation more consistent, and reduce the accumulation and disorder of high viscosity liquid crystals at the step edge.

Optionally, referring to FIG. 2, along the direction perpendicular to the first base plate 11, the thickness d11 of the overlapping part between the first insulation part 33 and the first electrode 31 is equal to the thickness d21 of the overlapping part between the second insulation part 43 and the second electrode 41, and the thickness d12 of the overlapping part between the first insulation part 33 and the first control line 32 is equal to the thickness d22 of the overlapping part between the second insulation part 43 and the second control line 42; a range of the thickness d11 of the overlapping part between the first insulation part 33 and the first electrode 31 includes 300-500 Å; and a range of the thickness d12 of the overlapping part between the first insulation part 33 and the first control line 32 includes 850-2000 Å. Thus, the insulation part can serve as the wrapping layer and covering layer of the electrode, so that the electrode can be isolated from external erosion such as water, oxygen, and acid. It can also improve the flatness of the orientation part, thereby enhancing the orientation ability of the liquid crystal and improving the uniformity of the phase shift degrees of the liquid crystal phase shifter. It is easy to manufacture and simple to implement.

There is no specific restriction on the thickness of the overlapping part between the first insulation part and the first electrode mentioned above. For example, the thickness of the overlapping part between the first insulation part and the first electrode can be 300 Å, 350 Å, 400 Å, or 500 Å, etc.

There is no specific restriction on the thickness of the overlapping part between the first insulation part and the first control line mentioned above. For example, the thickness of the overlapping part between the first insulation part and the first control line can be 850 Å, 900 Å, 950 Å, 1000 Å, 1500 Å, or 2000 Å, etc. Optionally, the range of the thickness of the overlapping part between the first insulation part and the first control line includes 1000-2000 Å. Specifically, the thickness of the overlapping part between the first insulation part and the first control line can be 1000 Å, 1200 Å, 1500 Å, or 2000 Å, etc.

Optionally, referring to FIG. 1 and FIG. 2, the phase shifter further includes a first alignment layer and a second alignment layer, the first alignment layer is located between the first base plate 11 and the first electrode layer, and the second alignment layer is located between the second base plate 12 and the second electrode layer; and the first alignment layer includes a third insulation part 52, the second alignment layer includes a fourth insulation part 62.

Referring to FIG. 2, along the direction perpendicular to the first base plate 11, a thickness d13 of an overlapping part between the third insulation part 52 and the first electrode 31 is less than a thickness d14 of an overlapping part between the third insulation part 52 and the first control line 32, and a thickness d23 of an overlapping part between the fourth insulation part 62 and the second electrode 41 is less than a thickness d24 of an overlapping part between the fourth insulation part 62 and the second control line 42.

There is no specific restriction on the structure of the first alignment layer mentioned above. For example, referring to FIG. 1 and FIG. 2, the first alignment layer can include a first alignment 51 and the third insulation part 52.

There is no specific restriction on the structure of the second alignment layer mentioned above. For example, referring to FIG. 1 and FIG. 2, the second alignment layer can include a second alignment 61 and the fourth insulation part 62.

In the phase shifter provided in the embodiment of the present application, by thinning the overlapping parts of the first insulation part and the third insulation part with the first electrode in the direction perpendicular to the first base plate, and thinning the overlapping parts of the second insulation part and the fourth insulation part with the second electrode in the direction perpendicular to the first base plate. On the one hand, that makes the thickness h3 of the first electrode 31 in the direction perpendicular to the first base plate 11 in FIG. 2 thicker than the thickness h1 of the first electrode 31 in the direction perpendicular to the first base plate 11 in FIG. 1, and makes the thickness h4 of the second electrode 41 in the direction perpendicular to the second base plate 12 in FIG. 2 thicker than the thickness h2 of the second electrode 41 in the direction perpendicular to the second base plate 12 in FIG. 1, which can further increase the thickness of the electrode and reduce the step edge. On the other hand, thinning of the insulation part on the electrode layer and the insulation part on the alignment layer can be achieved through the same mask plate, with a simple manufacturing process.

Optionally, the first electrode layer further includes a plurality of first auxiliary electrodes, the first auxiliary electrodes are spaced apart from the first electrode, an activity of the first auxiliary electrodes is greater than an activity of the first electrode, and the first auxiliary electrodes are at least located at one side of the first electrode; and the second electrode layer further includes a plurality of second auxiliary electrodes, the second auxiliary electrodes are spaced apart from the second electrode, an activity of the second auxiliary electrodes is greater than an activity of the second electrode, and the second auxiliary electrodes are at least located at one side of the second electrode. Thus, primary cells can be formed with the first electrode and the second electrode by the first auxiliary electrode and the second auxiliary electrode, preventing corrosion and oxidation of the first electrode, the second electrode, the first control line, and the second control line in the early stage of tape out and later actual use.

There is no specific restriction on the first auxiliary electrode and the second auxiliary electrode mentioned above. For example, both the first auxiliary electrode and the second auxiliary electrode may include metals such as zinc (Zn), aluminum (Al), etc.

The first auxiliary electrode is located on at least one side of the first electrode, which means that: the first auxiliary electrode is located on one side of the first electrode; or, the first auxiliary electrode mentioned above is located on multiple sides of the first electrode, which is not specifically limited here. The setting of the second auxiliary electrode is similar to that of the first auxiliary electrode, and will not be repeated here.

Figure 12:
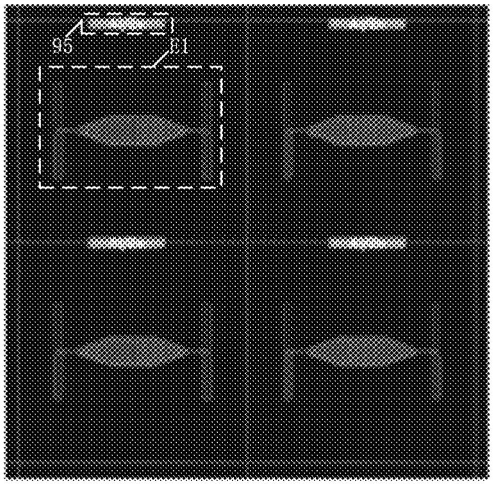
FIG. 12 is a schematic diagram of the distribution of an auxiliary electrode around a first region according to an embodiment of the present application.
Figure 13:
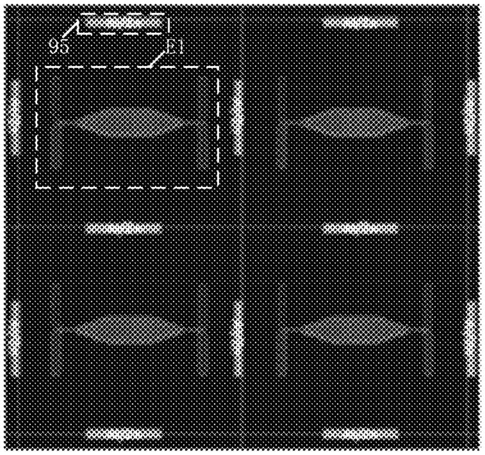
FIG. 13 is a schematic diagram of the distribution of another auxiliary electrode around a first region according to an embodiment of the present application.
Figure 14:
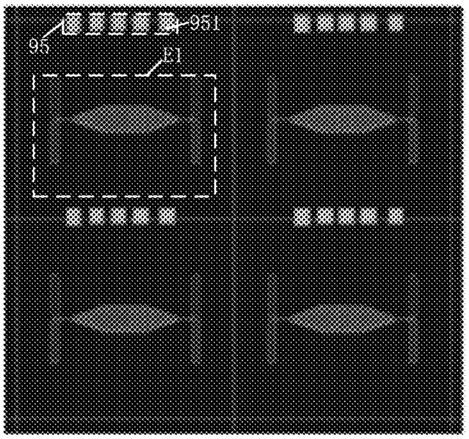
FIG. 14 is a schematic diagram of the distribution of yet another auxiliary electrode around a first region according to an embodiment of the present application.

FIG. 12 to FIG. 14 both use the case as an example for illustration, in which, the first auxiliary electrode and second auxiliary electrode are the same, their orthographic projections on the first base plate overlap to form an auxiliary electrode 95, and the auxiliary electrode 95 is at least located on one side of the first region E1. In this way, a primary cell may be formed by the auxiliary electrode and the electrode arranged at a position that does not affect the radiation of the unit, on the other hand, which can prevent electrode oxidation, on the other hand, it can improve the flatness above the electrodes that form overlapping capacitance regions, thereby enhancing the orientation ability of the liquid crystal and improving the uniformity of the phase shift degrees of the liquid crystal phase shifter.

It should be noted that firstly, the antenna unit may also include a third auxiliary electrode, which can be set outside the antenna unit composed of multiple phase shifters and spaced apart from the antenna unit, thereby forming a primary cell with the electrodes in the phase shifter without affecting the miniaturization of a single phase shifter.

Secondly, the above-mentioned auxiliary electrodes are all formed during the preparation process of the antenna unit and can be retained or removed during the formation of the antenna unit, which depends on actual needs.

Optionally, each of the plurality of first auxiliary electrodes includes a plurality of first sub-electrodes that are discrete, or, each of the plurality of first auxiliary electrodes is an integrated structure; and each of the plurality of second auxiliary electrodes includes a plurality of second sub-electrodes that are discrete, or, each of the plurality of second auxiliary electrode is the integrated structure. Thus, the primary cell can be achieved through various auxiliary electrode structures.

FIG. 12 and FIG. 13 both takes the auxiliary electrode 95 being the integrated structure as an example to illustrate. FIG. 14 takes the auxiliary electrode 95 including multiple first sub-electrodes 951 as an example to illustrate.

Optionally, the plurality of first auxiliary electrodes are arranged completely surrounding the first electrode; and the plurality of second auxiliary electrode are arranged completely surrounding the second electrode. At this point, it can be ensured that the primary cells are formed all around the electrode, further ensuring the performance of the phase shifter.

FIG. 13 takes the auxiliary electrode 95 arranged completely surrounding the first region E1 as an example to illustrate.

Optionally, the first control line includes a first subpart and a second subpart, the first subpart includes a plurality of first sub control lines, the second subpart is an integrated structure, one end of the plurality of first sub control lines is connected to the second subpart, and the other end of the plurality of first sub control lines is connected to the first electrode; and the second control line includes a third subpart and a fourth subpart, the third subpart includes a plurality of second sub control lines, the fourth subpart is the integrated structure, one end of the plurality of second sub control lines is connected to the fourth subpart, and the other end of the plurality of second sub control lines is connected to the second electrode. Thus, the part of the control line directly connected to the electrode can be designed with split slit bar in parallel, on the one hand, it can reduce the input resistance at the end, and on the other hand, it can feed the electrode with a uniform voltage.

Figure 15:
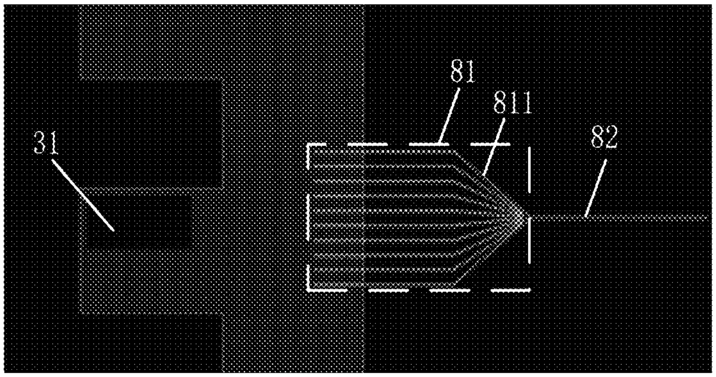
FIG. 15 is a schematic diagram of the electrical connection between a first electrode and a first control line according to an embodiment of the present application.

FIG. 15 takes the case as an example to illustrate, in which, the first control line includes the first subpart 81 and the second subpart 82, the first subpart 81 includes a plurality of first sub control lines 811, the second subpart 82 is an integrated structure, one end of the plurality of first sub control lines 811 is connected to the second subpart 82, and the other end of the plurality of first sub control lines 811 is connected to the first electrode 31.

Optionally, referring to FIG. 1 and FIG. 2, the phase shifter further includes a first flat layer 71 and a second flat layer 72, the first flat layer 71 covers the first electrode layer, and the second flat layer 72 covers the second electrode layer. The electrode thickness in the liquid crystal phase shifter is generally greater than 1.5 μm. After the formation of thicker electrodes, there will be step surfaces with a very large high and low drops on the surface. If the orientation liquid is directly coated in the future, it will cause problems such as insufficient coating of the orientation liquid, leading to disorder of liquid crystal orientation. Therefore, the flatness of subsequent film layers, such as the orientation part, can be improved through the flat layer to ensure the orientation of the liquid crystal.

There is no specific restriction on the materials of the first flat layer and the second flat layer mentioned above. For example, the materials of both the first flat layer and the second flat layer may include resin.

Optionally, in the direction perpendicular to the first base plate, along a direction from close to the first base plate to away from the first base plate, a density of the first electrode decreases; and in a direction perpendicular to the second base plate, along a direction from close to the second base plate to away from the second base plate, a density of the second electrode decreases. That makes the surface of the electrode away from the base plate more uniform and denser compared to the surface of the electrode close to the base plate, to ensure the performance of the phase shifter.

There is no specific restriction on the formation process of the first electrode mentioned above. For example, the first electrode can be formed through electroplating process and then sputtering process. Alternatively, the first electrode can be formed solely through the electroplating process or the sputtering process, where normal electroplating/sputtering is required close to the first base plate. When approaching the adjustable dielectric layer, slowing down the electroplating/sputtering speed, extending the electroplating/sputtering time, and appropriately reducing the electroplating/sputtering power. The formation process of the second electrode can refer to that of the first electrode, which will not be repeated here.

Optionally, the adjustable dielectric layer further includes dielectrics, the dielectrics are located between the first orientation part and the second orientation part; and a dielectric constant of the dielectrics is greater than or equal to 1.

There are no specific restrictions on the above-mentioned dielectrics here. For example, the dielectric can be a substance with a variable relative dielectric constant, such as a liquid crystal.

When the dielectric is the liquid crystal, the relative dielectric constant of the liquid crystal is greater than 1. The specific relative dielectric constant of the liquid crystals can be determined in practical processes based on the material of the liquid crystal, the working wavelength of the phase shifter, and so on.

The embodiments of the present application also provide an electronic device, including the above-mentioned phase shifter.

The electronic device can be applied to various circuit scenarios based on glass substrates, and there is no specific restriction here. The electronic devices can include terminal electronic devices, base station antenna electronic devices, indoor miniaturized relay devices, outdoor miniaturized relay devices, portable devices for satellite communication, mobile communication devices, and any other products or components with the functions of transmitting and/or receiving electromagnetic waves. The electronic device can also be applied to related electronic devices in other communication scenarios, such as products that have been promoted or have good promotion prospects including mobile phones, tablets, Wi-Fi (Wireless Fidelity), radar, and so on.

Figure 16:
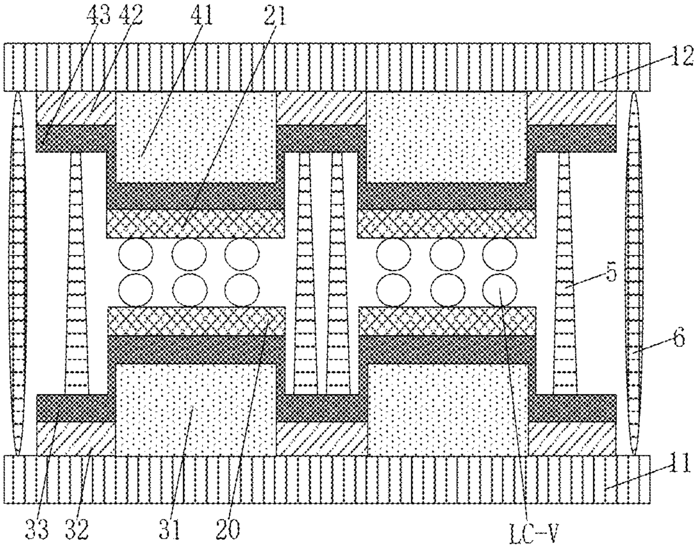
FIG. 16 is a schematic structural diagram of yet another phase shifter according to an embodiment of the present application.
Figure 17:
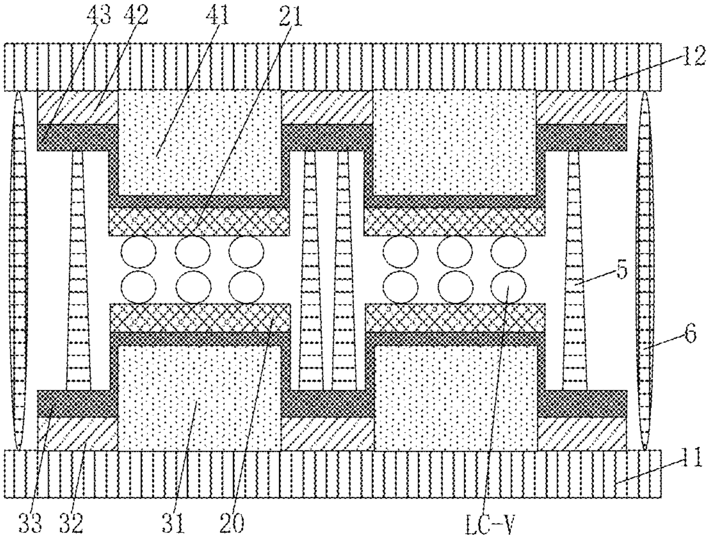
FIG. 17 is a schematic structural diagram of yet another phase shifter according to an embodiment of the present application.

FIG. 16 and FIG. 17 are illustrated using an electronic device including two phase shifters units as an example. It should be noted that the difference between the phase shifters in FIG. 16 and FIG. 17 is only that, along the direction perpendicular to the first base plate 11, the thickness of the overlapping part between the first insulation part 33 and the first electrode 31 in FIG. 17 is less than that of the overlapping part between the first insulation part 33 and the first electrode 31 in FIG. 16, and the thickness of the overlapping part between the second insulation part 43 and the second electrode 41 in FIG. 17 is less than that of the overlapping part between the second insulation part 43 and the second electrode 41 in FIG. 16.

The electronic device provided in the embodiment of the present application can reduce or eliminate the impact of the control lines on the performance of the electronic devices, increase the flexibility of the wiring of the control lines, improve design freedom, reinforce strength, and has good characteristics such as large phase shift amount, small size, and efficient integration. It also greatly simplifies the process preparation process, reduces the difficulty of the process, and is easy to implement.

The embodiments of the present application also provide a preparation method for the above phase shifter as shown in FIG. 16 and FIG. 17.

Figure 18:
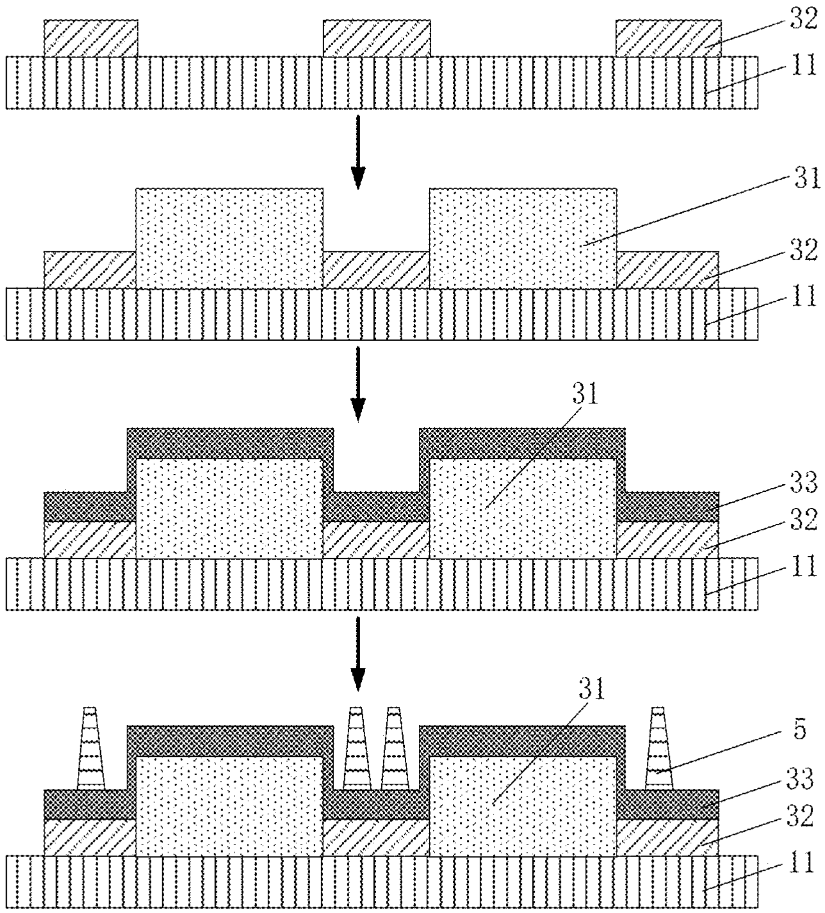
FIG. 18 is a flow chart of a preparation process of a first cell base plate in the phase shifter shown in FIG. 16.
Figure 21:
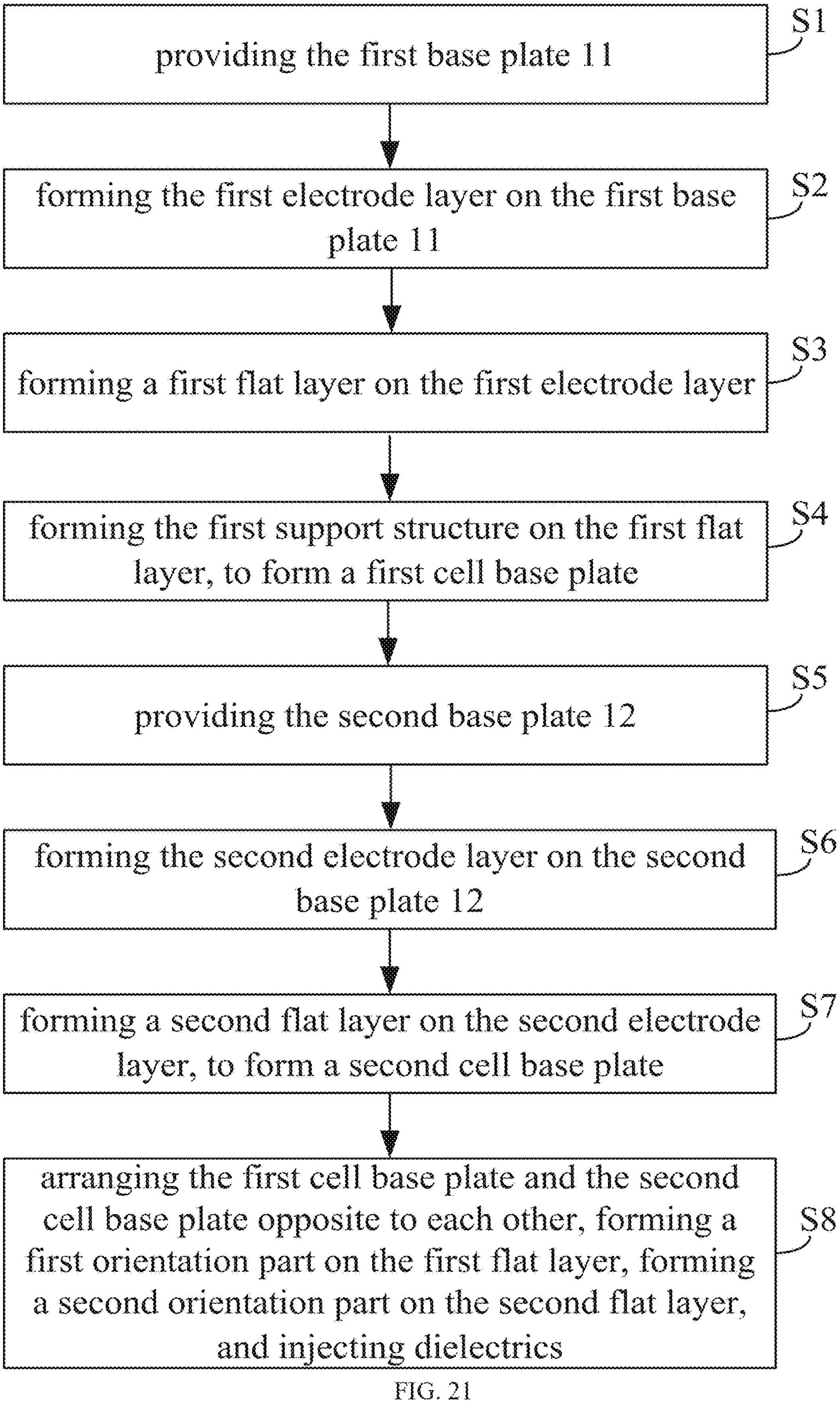
FIG. 21 is a flow chart of a preparation process of the phase shifter shown in FIG. 16.

The preparation method includes:

S1, referring to FIGS. 18 and 21, providing the first base plate 11.

S2, referring to FIGS. 18 and 21, forming the first electrode layer on the first base plate 11.

There is no specific restriction on the process of forming the first electrode layer on the first base plate. For example, referring to FIG. 18, a layer of 500 Å ITO metal can be deposited on the first base plate 11, and patterning through photolithography and etching processes can be performed to form the first control line 32. Next, Cu with 0.5-10 μm is deposited through the Sputter process, patterning through photolithography and etching processes is performed to form a first electrode 31. Then, the surface of the Cu electrode is treated with ammonia gas for 10-30 seconds, the oxide layer on the surface of the Cu electrode is removed, and 1000-2000 Å of silicon nitride is deposited on the Cu electrode to form the first insulation part 33.

S3, forming a first flat layer on the first electrode layer.

S4, forming the first support structure 5 on the first flat layer, to form a first cell base plate.

There is no specific restriction on the process of forming the first support structure 5 on the first flat layer mentioned above. For example, a certain thickness of PS material can be coated by spin coating or slit coating, and then patterning is achieved through photolithography.

It should be noted that the first flat layer is not shown in FIG. 18, therefore the first support structure 5 is arranged on the first insulation part 33 to form a first cell base plate.

Figure 19:
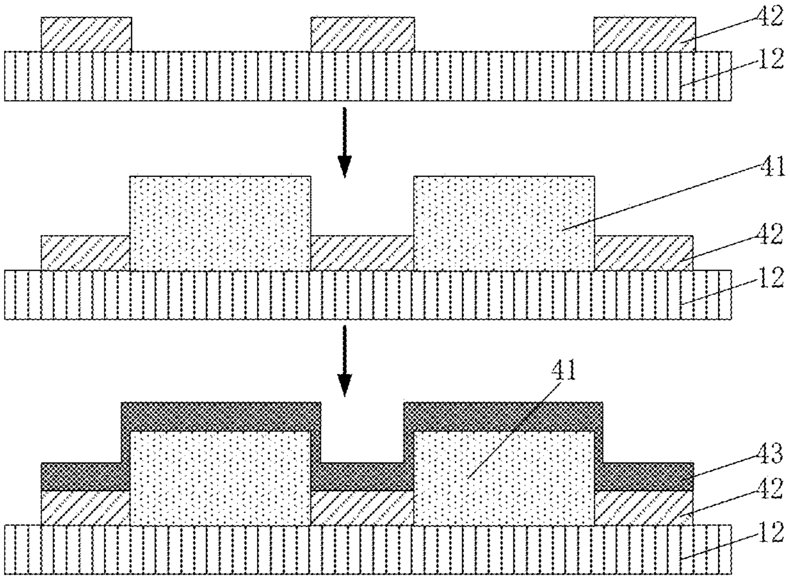
FIG. 19 is a flow chart of a preparation process of a second cell base plate in the phase shifter shown in FIG. 16.

S5, referring to FIGS. 19 and 21, providing the second base plate 12.

S6, referring to FIGS. 19 and 21, forming the second electrode layer on the second base plate 12.

The formation process of the second electrode layer can refer to that of the first electrode layer, which will not be repeated here.

S7, forming a second flat layer on the second electrode layer, to form a second cell base plate.

It should be noted that the second flat layer forming the second cell base plate is not shown in FIG. 19.

S8, arranging the first cell base plate and the second cell base plate opposite to each other, forming a first orientation part on the first flat layer, forming a second orientation part 21 on the second flat layer, and injecting dielectrics.

It should be noted that the above steps S1-S4 and S5-S7 can be performed simultaneously. Alternatively, steps S1-S4 can be performed first, followed by steps S5-S7. Alternatively, steps S5-S7 can be performed first, followed by steps S1-S4.

In the preparation method of the phase shifter provided in the embodiments of the present application, the preparation process is simple and easy to process, and the cost is low. When an electric field is applied between the first electrode and the second electrode in the phase shifter prepared by the method provided in the embodiment, the electric field drives the deviation of the dielectric direction in the adjustable dielectric layer, thereby achieving the phase-shifting function of the phase shifter. Moreover, the first support structure 5 is arranged in the non-capacitive overlapping region between the first base plate and the second base plate, which can provide good support and reduce or even eliminate the influence on the phase-shifting effect, to achieve large phase shift amount, high uniformity of the phase shift degrees, low loss, and so on.

Figure 20:
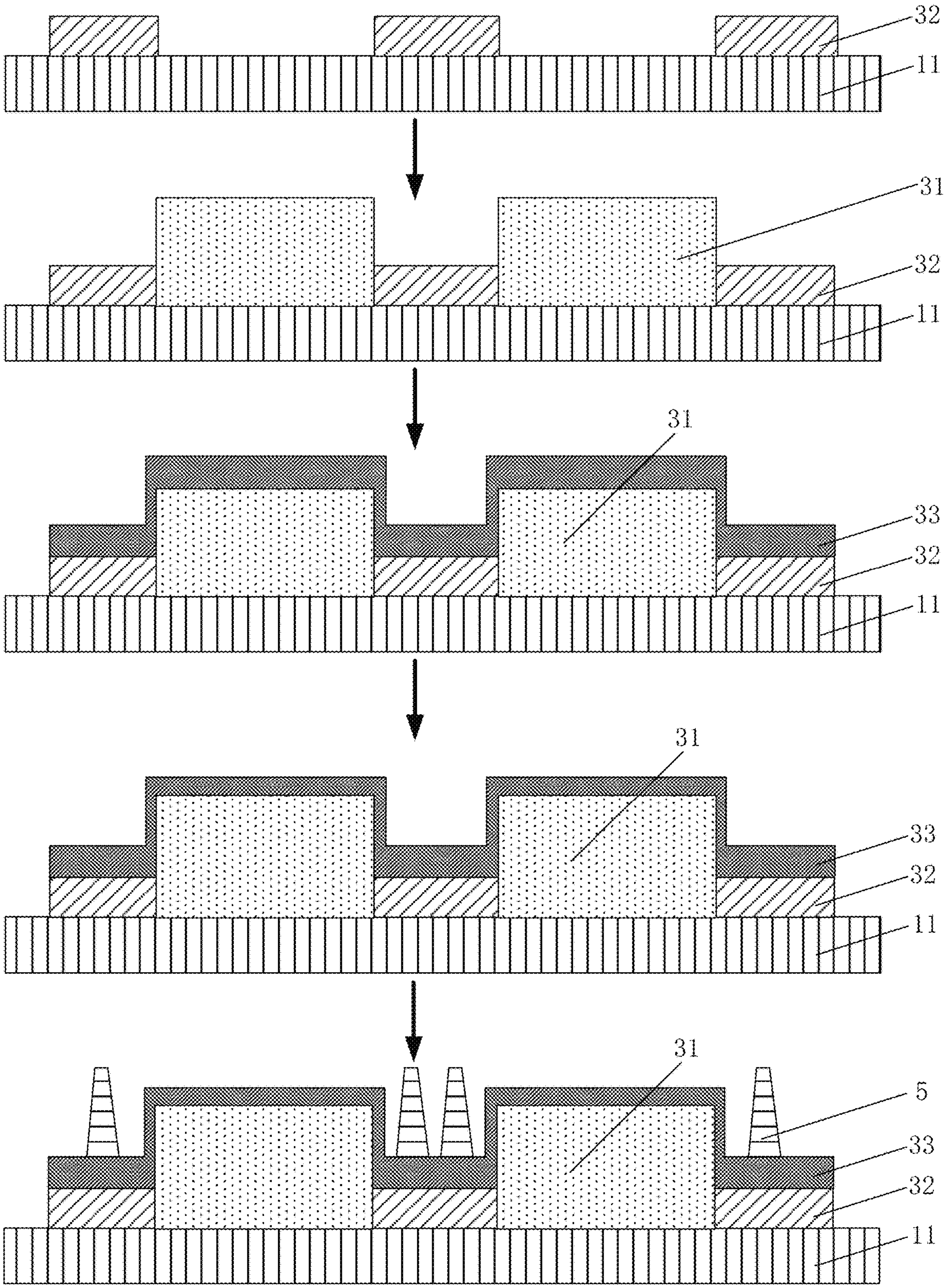
FIG. 20 is a flow chart of a preparation process of a first cell base plate in the phase shifter shown in FIG. 17.

Optionally, step S2, forming the first electrode layer on the first base plate includes:

referring to FIG. 20, forming the first electrode 31 and the first control line 32 on the first base plate 11; and referring to FIG. 20, forming an insulation part 33 on the first electrode 31 and the first control line 32, and performing thinning treatment on an overlapping part between the insulation part 33 and the first electrode 31 along the direction perpendicular to the first base plate 11, to form the first electrode layer.

Wherein S6, forming the second electrode layer on the second base plate includes:

forming the second electrode and the second control line 42 on the second base plate; and forming another insulation part 33 on the second electrode and the second control line 42, and performing the thinning treatment on an overlapping part between the another insulation part 33 and the second electrode along a direction perpendicular to the second base plate, to form the second electrode layer.

The embodiment of the present application performs the thinning treatment on the first insulation part 33 covered on the first electrode and the second insulation part 43 covered on the second electrode. In this way, on the one hand, the electrodes can be wrapped by the insulation parts 33, 43 to prevent oxidation of the electrode. On the other hand, it can ensure that the waveform and wave speed of high-frequency microwaves can be maintained better when passing through the insulation parts 33, 43, with lower loss, and which can significantly reduce the driving voltage of the liquid crystal. On the other hand, it can reduce the height of the step edge between the region with electrodes and the region without electrodes, which is more conducive to the subsequent coating of the film layer. For example, the flat layer can be coated more evenly, and it can also make the liquid crystal orientation more consistent, reducing the accumulation and disorder of high viscosity liquid crystals at the step edge.

Optionally, before step S2, forming the first electrode layer on the first base plate, the preparation method further includes:

forming a plurality of first alignment marks on the first base plate; and forming a third insulation part on the plurality of first alignment marks, and performing the thinning treatment on an overlapping part between the third insulation part and the first electrode along the direction perpendicular to the first base plate, to form a first alignment layer.

Wherein before step S6, forming the second electrode layer on the second base plate, the preparation method further includes:

forming a plurality of second alignment marks on the second base plate; and forming a fourth insulation part on the plurality of second alignment marks, and performing the thinning treatment on an overlapping part between the fourth insulation part and the second electrode along the direction perpendicular to the second base plate, to form a second alignment layer.

The embodiment of the present application performs the thinning treatment on the overlapping part of the first insulation part 33 and the third insulation part with the first electrode, and performs the thinning treatment on the overlapping part of the second insulation part 43 and the fourth insulation part with the second electrode. On the one hand, it can make the thickness of the first electrode thicker in the direction perpendicular to the first base plate, and the thickness of the second electrode thicker in the direction perpendicular to the second base plate, thereby further increasing the thickness of the electrode and reducing the step edge. On the other hand, it is possible to achieve thinning of the insulation part on the electrode layer and the insulation part on the alignment layer through the same mask plate, achieving reuse of the mask plate with a simple manufacturing process.

The structural description of the phase shifter in the present application embodiment can refer to the above embodiments, and will not be repeated here.

In the specification provided here, a large number of specific details are explained. However, it can be understood that the embodiments of the present application can be practiced without these specific details. In some examples, well-known methods, structures, and techniques are not shown in detail to avoid blurring the understanding of the specification.

Finally, it should be noted that the above embodiments are only used to illustrate the technical solution of the present application, and not to limit it. Although the present application has been described in detail with reference to the aforementioned embodiments, persons skilled in the art should understand that they can still modify the technical solutions recorded in the aforementioned embodiments, or equivalently replace some of the technical features therein. And these modifications or replacements do not make the essence of the corresponding technical solutions deviate from the spirit and scope of the technical solutions in the various embodiments of the present application.

The invention claimed is:

1. A phase shifter, comprising:

a first base plate and a second base plate, wherein the first base plate and the second base plate are arranged opposite to each other;

a first electrode layer, arranged at a side of the first base plate close to the second base plate, and comprising a first electrode, a first control line and a first insulation part, wherein the first electrode and the first control line are electrically connected, and the first insulation part covers the first electrode and the first control line;

a second electrode layer, arranged at a side of the second base plate close to the first electrode layer, and comprising a second electrode, a second control line and a second insulation part, wherein the second electrode and the second control line are electrically connected, and the second insulation part covers the second electrode and the second control line; along a direction perpendicular to the first base plate, the first electrode and the second electrode at least partially overlap to form a first region; and an adjustable dielectric layer, arranged between the first electrode layer and the second electrode layer, and comprising a first support structure, wherein the first support structure is arranged on at least one side of the first region, and an orthographic projection of the first support structure on the first base plate is at least non-overlapping with an orthographic projection of the first region on the first base plate.

2. The phase shifter according to claim 1, wherein along the direction perpendicular to the first base plate, the first electrode and the second electrode partially overlap to form the first region, and a non-overlapping part between the first electrode and the second electrode forms a second region;

the orthographic projection of the first support structure on the first base plate and an orthographic projection of the second region on the first base plate are non-overlapping.

3. The phase shifter according to claim 1, wherein along the direction perpendicular to the first base plate, the first electrode and the second electrode completely overlap to form the first region.

4. The phase shifter according to claim 3, wherein the adjustable dielectric layer further comprises a first orientation part and a second orientation part, the first orientation part is located at a side of the first insulation part away from the first electrode, and the second orientation part is located at a side of the second insulation part away from the second electrode; and a height g1 of the first support structure along the direction perpendicular to the first base plate satisfies g1=h1+h2+h3−h4−h5; wherein h1 is a height g1 of the first electrode along the direction perpendicular to the first base plate, h2 is a height g1 of the second electrode along the direction perpendicular to the first base plate, h3 is a spacing between the first base plate and the second base plate along the direction perpendicular to the first base plate, h4 is a height g1 of the first orientation part along the direction perpendicular to the first base plate, and h5 is a height g1 of the second orientation part along the direction perpendicular to the first base plate.

5. The phase shifter according to claim 3, wherein in a first direction and a second direction, spacings between the orthographic projection of the first support structure on the first base plate and the orthographic projection of the first region on the first base plate are greater than or equal to 400 μm; wherein the first direction is perpendicular to the second direction.

6. The phase shifter according to claim 5, wherein the first support structure comprises a plurality of support columns, adjacent support columns are arranged at an interval; all of the support columns are divided into a plurality of support groups, each support group comprises the plurality of support columns; and at least one side of the first region is provided with the plurality of support groups, the plurality of support groups located at a same side of the first region are sorted in the first direction, the support group located in a first sequence is a first support group, the support group located in a last sequence is a second support group; an area of orthographic projections of the support columns in the first support group on the first base plate is greater than an area of orthographic projections of the support columns in the second support group on the first base plate; within a unit area, a distribution density of the support columns in the first support group is less than a distribution density of the support columns in the second support group.

7. The phase shifter according to claim 6, wherein the support group located in a middle sequence between the first sequence and the last sequence is a third support group; and along a direction from the first support group to the second support group, an area of orthographic projections of the support columns in each support group on the first base plate decreases sequentially; within a unit area, a distribution density of the support columns in each support group increases sequentially.

8. The phase shifter according to claim 7, wherein along the first direction, the first support structures are arranged at two sides of the first region, and are mirror symmetrical about the first region;

a side of the first region is provided with one first support group, one second support group and one third support group, the support columns in each support group are arranged along the second direction, and the area of the orthographic projections of the support columns in each support group on the first base plate is the same; spacings between geometric centers of adjacent support columns in each support group are the same, and are the same as spacings between geometric centers of adjacent support columns in the other support groups;

a shape of the orthographic projections of the support columns in each support group on the first base plate is a circle, and a radius range of the circle comprises 20-200 μm; and a height range of the support columns in each support group along the direction perpendicular to the first base plate comprises 5-50 μm.

9. The phase shifter according to claim 8, wherein in the second direction, connecting lines of the geometric centers of the plurality of support columns in the first support group are in a straight line, connecting lines of the geometric centers of the plurality of support columns in the second support group are in a straight line, and connecting lines of the geometric centers of the plurality of support columns in the third support group are in a straight line; the connecting lines of the geometric centers of the plurality of support columns in the first support group, the connecting lines of the geometric centers of the plurality of support columns in the second support group and the connecting lines of the geometric centers of the plurality of support columns in the third support group are all parallel; and in the first direction and the second direction, the spacings between the orthographic projection of the first support group on the first base plate and the orthographic projection of the first region on the first base plate are greater than 400 μm, spacings between an orthographic projection of the third support group on the first base plate and the orthographic projection of the first support group on the first base plate are greater than 500 μm, and spacings between an orthographic projection of the second support group on the first base plate and the orthographic projection of the third support group on the first base plate are greater than 600 μm.

10. The phase shifter according to claim 4, wherein the first support structure at least comprises a support part, and the support part is patterned and arranged surrounding the first region; and the support part comprises a plurality of first patterns, adjacent first patterns are arranged at an interval, and orthographic projections of the plurality of first patterns on the first base plate are at least partially the same.

11. The phase shifter according to claim 10, wherein the support part is arranged completely surrounding the first region; in the first direction and the second direction, spacings between an orthographic projection of the support part on the first base plate and the orthographic projection of the first region on the first base plate is equal to 400 μm; and the first region and the support part are both symmetrical about the first axis.

12. The phase shifter according to claim 11, wherein shapes of the orthographic projections of the plurality of first patterns on the first base plate comprises rectangles and irregular polygons, and areas of the rectangles are at least partially different from areas of the irregular polygons; or the shapes of the orthographic projections of the plurality of first patterns on the first base plate comprises circles, areas of the circles are the same.

13. The phase shifter according to claim 12, wherein the first support structure further comprises a plurality of support columns, adjacent support columns are arranged at an interval; all of the support columns are divided into a plurality of support groups, and each support group comprises the plurality of support columns; and at least one side of the support part is provided with the plurality of support groups, the plurality of support groups located at a same side of the support part are sorted in the first direction, the support group located in a first sequence is a fourth support group, the support group located in a last sequence is a fifth support group, and the support group located in a middle sequence is a sixth support group; areas and shapes of the orthographic projections of the support columns in each support group on the first base plate are both the same.

14. The phase shifter according to claim 12, wherein the first support structure further comprises a plurality of support columns, adjacent support columns are arranged at an interval; all of the support columns are divided into a plurality of support groups, and each support group comprises the plurality of support columns; and at least one side of the support part is provided with the plurality of support groups, the plurality of support groups located at a same side of the support part are sorted in the first direction, the support group located in a first sequence is a fourth support group, the support group located in a last sequence is a fifth support group, and the support group located in a middle sequence is a sixth support group; along a direction from the fourth support group to the fifth support group, an area of orthographic projections of the support columns in each support group on the first base plate decreases sequentially.

15. The phase shifter according to claim 5, wherein a material of the first electrode comprises copper, and a thickness range of the first electrode along the direction perpendicular to the first base plate comprises 0.5-10 μm; and a material of the second electrode comprises copper, and a thickness range of the second electrode along a direction perpendicular to the second base plate comprises 0.5-10 μm.

16. The phase shifter according to claim 15, wherein along the direction perpendicular to the first base plate, a thickness of an overlapping part between the first insulation part and the first electrode is less than a thickness of an overlapping part between the first insulation part and the first control line, and a thickness of an overlapping part between the second insulation part and the second electrode is less than a thickness of an overlapping part between the second insulation part and the second control line.

17. The phase shifter according to claim 16, wherein along the direction perpendicular to the first base plate, the thickness of the overlapping part between the first insulation part and the first electrode is equal to the thickness of the overlapping part between the second insulation part and the second electrode, and the thickness of the overlapping part between the first insulation part and the first control line is equal to the thickness of the overlapping part between the second insulation part and the second control line;

a range of the thickness of the overlapping part between the first insulation part and the first electrode comprises 300-500 Å; and a range of the thickness of the overlapping part between the first insulation part and the first control line comprises 850-2000 Å.

18. The phase shifter according to claim 16, wherein the phase shifter further comprises a first alignment layer and a second alignment layer, the first alignment layer is located between the first base plate and the first electrode layer, and the second alignment layer is located between the second base plate and the second electrode layer; and the first alignment layer comprises a third insulation part, the second alignment layer comprises a fourth insulation part; along the direction perpendicular to the first base plate, a thickness of an overlapping part between the third insulation part and the first electrode is less than a thickness of an overlapping part between the third insulation part and the first control line, and a thickness of an overlapping part between the fourth insulation part and the second electrode is less than a thickness of an overlapping part between the fourth insulation part and the second control line.

19. A preparation method of the phase shifter according to claim 1, wherein the preparation method comprises:

providing the first base plate;

forming the first electrode layer on the first base plate;

forming a first flat layer on the first electrode layer;

forming the first support structure on the first flat layer, to form a first cell base plate;

providing the second base plate;

forming the second electrode layer on the second base plate;

forming a second flat layer on the second electrode layer, to form a second cell base plate;

arranging the first cell base plate and the second cell base plate opposite to each other, forming a first orientation part on the first flat layer, forming a second orientation part on the second flat layer, and injecting dielectrics.

20. An electronic device, comprising the phase shifter according to claim 1.

* * * * *